(12) United States Patent
Park et al.

(10) Patent No.: US 12,300,898 B2
(45) Date of Patent: May 13, 2025

(54) SEPARABLE ANTENNA AND ELECTRONIC DEVICE COMPRISING SAME

(71) Applicant: Samsung Electronics Co., Ltd., Suwon-si (KR)

(72) Inventors: Sanghoon Park, Suwon-si (KR); Kwanghyun Baek, Suwon-si (KR); Juneseok Lee, Suwon-si (KR); Dohyuk Ha, Suwon-si (KR); Jungho Park, Suwon-si (KR); Youngju Lee, Suwon-si (KR); Jungyub Lee, Suwon-si (KR); Jinsu Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 18/192,910

(22) Filed: Mar. 30, 2023

(65) Prior Publication Data

US 2023/0299506 A1    Sep. 21, 2023

Related U.S. Application Data

(63) Continuation of application No. PCT/KR2022/001785, filed on Feb. 4, 2022.

(30) Foreign Application Priority Data

Feb. 4, 2021    (KR) .................. 10-2021-0016358

(51) Int. Cl.
*H01Q 21/28*    (2006.01)
*H01Q 1/22*    (2006.01)

(52) U.S. Cl.
CPC ........... *H01Q 21/28* (2013.01); *H01Q 1/2283* (2013.01)

(58) Field of Classification Search
CPC .................. H01Q 21/28; H01Q 1/2283
See application file for complete search history.

(56) References Cited

U.S. PATENT DOCUMENTS 9,041,229 B1    5/2015    Johnson
9,196,958 B2    11/2015    Arnold et al.
(Continued)

FOREIGN PATENT DOCUMENTS

JP    2006-294835 A    10/2006
KR    10-1212999 B1    12/2012
(Continued)

OTHER PUBLICATIONS

European Office Action dated May 6, 2024 issued in European Application No. 22750060.0.
(Continued)

*Primary Examiner* — Graham P Smith
(74) *Attorney, Agent, or Firm* — Jefferson IP Law, LLP

(57) ABSTRACT

The disclosure relates to a 5th generation (5G) or pre-5G communication system for supporting a higher data transmission rate than a 4th generation (4G) communication system such as long term evolution (LTE). An antenna module is provided. The antenna module includes a plurality of antennas, a first printed circuit board (PCB) on which the plurality of antennas are disposed, a second PCB on which one or more elements for processing a radio frequency (RF) signal are disposed, and an adhesive material for bonding the first PCB and the second PCB, wherein the first PCB includes a first metal layer, a second metal layer, a dielectric, and a coupling structure plated along the first metal layer, the second metal layer, and a via hole between the first metal layer and the second metal layer, and may be disposed to provide a coupling connection through the coupling structure of the first PCB.

20 Claims, 22 Drawing Sheets

(56) References Cited

U.S. PATENT DOCUMENTS

| | | | |
|---|---|---|---|
| 9,905,918 | B2 | 2/2018 | Huang |
| 9,985,346 | B2 | 5/2018 | Baks et al. |
| 10,374,322 | B2 | 8/2019 | Labonte et al. |
| 10,566,298 | B2 | 2/2020 | Dalmia et al. |
| 10,615,511 | B2 | 4/2020 | Labonte et al. |
| 11,357,099 | B2 | 6/2022 | Baek et al. |
| 2016/0172761 | A1 | 6/2016 | Garcia et al. |
| 2019/0355694 | A1 | 11/2019 | Wan et al. |
| 2020/0058998 | A1 | 2/2020 | Kirknes |
| 2020/0091583 | A1 | 3/2020 | Choi et al. |
| 2020/0161744 | A1 | 5/2020 | Baks et al. |
| 2020/0185342 | A1 | 6/2020 | Dalmia et al. |
| 2020/0212539 | A1 | 7/2020 | Yun et al. |
| 2021/0021024 | A1 | 1/2021 | Park et al. |
| 2022/0131279 | A1 | 4/2022 | Kim et al. |

FOREIGN PATENT DOCUMENTS

| | | |
|---|---|---|
| KR | 10-2018-0006811 A | 1/2018 |
| KR | 10-1946529 B1 | 2/2019 |
| KR | 10-2019-0043328 A | 4/2019 |
| KR | 10-2061620 B1 | 1/2020 |
| KR | 10-2020-0097620 A | 8/2020 |
| KR | 10-2022-0053865 A | 5/2022 |

OTHER PUBLICATIONS

Korea Office Action dated Mar. 19, 2025, issued in Korean Application No. 10-2021-0016358.

SEPARABLE ANTENNA AND ELECTRONIC DEVICE COMPRISING SAME

CROSS-REFERENCE TO RELATED APPLICATION(S)

This application is a continuation application, claiming priority under § 365 (c), of an International Application No. PCT/KR2022/001785, filed on Feb. 4, 2022, which is based on and claims the benefit of a Korean patent application number 10-2021-0016358, filed on Feb. 4, 2021, in the Korean Intellectual Property Office, the disclosure of which is incorporated by reference herein in its entirety.

BACKGROUND

1. Field

The disclosure relates to a wireless communication system. More particularly, the disclosure relates to a separable antenna and an electronic device including the same in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency (millimeter wave (mmWave)) bands (e.g., 60 gigahertz (GHZ) bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

There has been development of products equipped with multiple antennas in order to improve communication performance, and it is expected that, by utilizing massive MIMO technology, equipment having far more antennas will be used gradually. As communication devices has more antenna elements, there is an increasing demand for a separable antenna structure for efficiently designing antenna equipment.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device having a separable antenna structure and a method for manufacturing the same.

Another aspect of the disclosure is to provide a structure of a flexible printed circuit board (FPCB) and a device including the same, in order to design an electronic device having a separable antenna structure, in a wireless communication system.

Another aspect of the disclosure is to provide an adhesive member between an FPCB and a printed circuit board (PCB) and a device including the same, in order to implement a separable antenna, in a wireless communication system.

Another aspect of the disclosure is to provide a structure for coupling connection between an FPCB and a printed circuit board (PCB) and a device including the same, in order to implement a separable antenna, in a wireless communication system.

Additional aspects will be set forth in part in the description which follows and, in part, will be apparent from the description, or may be learned by practice of the presented embodiments.

In accordance with an aspect of the disclosure, an antenna module is provided. The antenna module includes a plurality of antennas, a first printed circuit board (PCB) on which the plurality of antennas are disposed, a second PCB on which one or more elements configured to process a radio frequency (RF) signal are disposed, and an adhesive material configured to couple the first PCB and the second PCB to each other, wherein the first PCB includes a first metal layer, a second metal layer, a dielectric, and a coupling structure plated along the first metal layer, the second metal layer, and a via hole between the first metal layer and the second metal layer, and the antenna module is disposed to provide coupling connection via the coupling structure of the first PCB and a coupling pad of the second PCB.

In accordance with another aspect of the disclosure, an electronic device is provided. The electronic device includes a plurality of first printed circuit boards (PCBs), wherein an antenna circuit is disposed on each of the plurality of first printed circuit boards (PCBs), a second PCB on which a power supply, a direct current (DC)/DC converter, and a field programmable gate array (FPGA) are disposed, and a plurality of third PCBs, wherein a radio frequency integrated circuit (RFIC) is disposed on each of the plurality of third PCBs, wherein each of the plurality of first PCBs is coupled to the second PCB via an adhesive material, each of the plurality of third PCBs is coupled to the second PCB via a grid array, a first PCB among the plurality of first PCBs includes a first metal layer, a second metal layer, a dielectric, and a coupling structure plated along the first metal layer, the second metal layer, and a via hole between the first metal layer and the second metal layer, and the coupling structure is disposed to provide coupling connection via a coupling pad of the second PCB.

A separable antenna structure and a device including the same, according to various embodiments of the disclosure, have a flexible printed circuit board (FPCB) for an antenna, which is designed in view of the size of a via, the thickness of plating, the number of times of plating, or the disposition between coupling structures, thereby providing robustness against pressure and facilitating mass production.

In addition, a separable antenna structure and a device including the same, according to various embodiments of the disclosure, have connection between an antenna board and a main board configured through an adhesive material such that a high-performance antenna and an efficient main board can be designed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
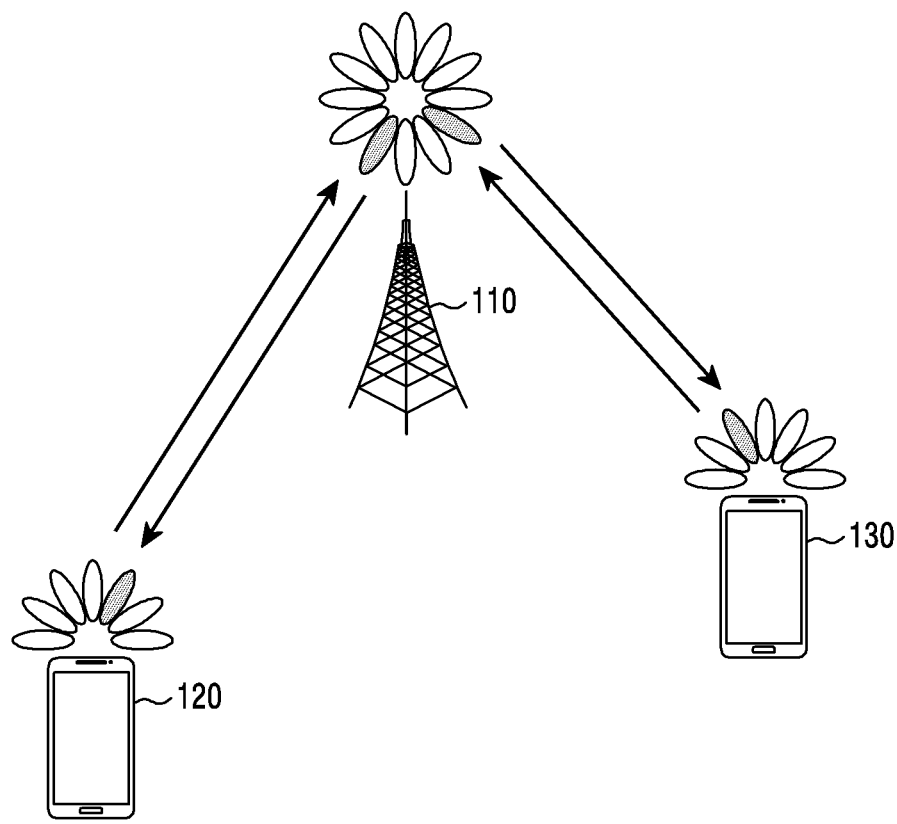
FIG. 1 shows an example of a wireless communication environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to a device and method for transmitting a control channel in a wireless communication system. Specifically, the disclosure describes a method for more effectively designing a physical uplink control channel (PUCCH), which is a control channel, at the time of transmitting uplink control information in a wireless communication system, a new format, and a procedure at a transmitter or a receiver according to the method, combines the same with an existing operation, and also describes a method for adaptively using the same.

In the following description, terms referring to components of an electronic device (e.g., substrate, plate, print circuit board (PCB), flexible PCB (FPCB), module, antenna, antenna element, circuit, processor, chip, element, and device), terms referring to shapes of components (e.g., structure, support part, contact part, protrusion, and opening), terms referring to connection parts between structures (e.g., connection part, contact part, support part, contact structure, conductive member, and assembly), terms referring to circuits (e.g., transmission line, PCB, FPCB, signal line, feeding line, data line, RF signal line, antenna line, RF path, RF module, and RF circuit), and the like are illustratively used for the convenience of description. Therefore, the disclosure is not limited by the terms as used below, and other terms referring to subjects having equivalent technical meanings may be used. In addition, as used below, such term as " . . . unit," " . . . device," " . . . material," or " . . . body" may imply at least one shape structure or a unit for processing a function.

In the disclosure, various embodiments will be described using terms employed in some communication standards (e.g., long term evolution (LTE) and new radio (NR) defined by the 3rd generation partnership project (3GPP)), but they are only for the sake of illustration. The embodiments of the disclosure may also be easily applied to other communication systems through modifications.

Furthermore, as used in the disclosure, the expression "greater than" or "less than" is used to determine whether a specific condition is satisfied or fulfilled, but this is intended only to illustrate an example and does not exclude "greater than or equal to" or "equal to or less than." A condition indicated by the expression "greater than or equal to" may be replaced with a condition indicated by "greater than," a condition indicated by the expression "equal to or less than" may be replaced with a condition indicated by "less than," and a condition indicated by "greater than and equal to or less than" may be replaced with a condition indicated by "greater than and less than."

Hereinafter, the disclosure relates to a detachable antenna structure in a wireless communication system and an electronic device including same. Specifically, the disclosure describes a technique for achieving a stable connection between an antenna board and a radio frequency (RF) board, for a structure in which an RF board having RF components arranged thereon and an antenna board having radiators such as antennas arranged thereon are independently implemented in a wireless communication system.

FIG. 1 illustrates a wireless communication environment according to an embodiment of the disclosure. A wireless communication environment 100 of FIG. 1 is a part of nodes using a wireless channel, and illustrates a base station 110 and a terminal 120.

The base station 110 is a network infrastructure configured to provide a wireless connection to the terminal 120. The base station 110 has coverage defined as a predetermined geographical area based on a distance over which a signal may be transmitted. The base station 110 may be referred to, besides a base station, as a massive multiple input multiple output (MIMO) unit (MMU), an "access point (AP)," an "eNodeB (eNB)," a "5th generation node (5G Node)," a "5G NodeB (NB)," a "wireless point," a "transmission/reception point (TRP)," an "access unit," a "distributed unit (DU)," a "transmission/reception point (TRP)," a "radio unit (RU)," a remote radio head (RRH), or another term having an equivalent technical meaning. The base station 110 may transmit a downlink signal or receive an uplink signal.

The terminal 120 is a device configured to be used by a user, and performs communication with the base station 110 via a wireless channel. In some cases, the terminal 120 may be operated without user involvement. In other words, the terminal 120 may be a device configured to perform machine type communication (MTC), and may not be carried by a user. The terminal 120 may be referred to, besides a terminal, as a "user equipment (UE)," a "mobile station," a "subscriber station," a "customer premises equipment (CPE)," a "remote terminal," a "wireless terminal," an "electronic device," a "vehicle terminal," a "user device," or another term having an equivalent technical meaning.

The terminal 120 and a terminal 130 shown in FIG. 1 may support vehicle communication. In a case of vehicle communication, in an LTE system, standardization work for vehicle-to-everything (V2X) technology based on a device-to-device (D2D) communication structure was completed in 3GPP Release 14 and Release 15, and currently efforts to develop V2X technology based on 5G NR are under way. In NR V2X, unicast communication, groupcast (or multicast) communication, and broadcast communication are supported between terminals.

As one of technologies for mitigating propagation path loss and increasing the propagation distance of radio waves, beamforming technology is being used. Beamforming generally concentrates the reach area of radio waves using multiple antennas or increases the directivity of reception sensitivity in a specific direction. Therefore, in order to form a beamforming coverage instead of forming a signal in an isotropic pattern using a single antenna, a communication equipment may include multiple antennas. Hereinafter, an antenna array including multiple antennas is described.

The base station 110 or the terminal 120 may include an antenna array. Each antenna included in the antenna array may be referred to as an array element or an antenna element. Hereinafter, in the disclosure, the antenna array has been shown as a two-dimensional planar array, but this is merely an embodiment and does not limit other embodiments of the disclosure. The antenna array may be configured in various shapes such as a linear array or a multi-layer array. The antenna array may be referred to as a massive antenna array.

A main technology to improve data capacity of 5G communication is beamforming technology using an antenna array connected to multiple RF paths. For higher data capacity, the number of RF paths should be increased or the power per RF path should be increased. Increasing the number of RF paths increases the size of a product and is currently at a level that the increasing is impossible due to space constraints in installing actual base station equipment. In order to increase the antenna gain through high output without increasing the number of RF paths, the antenna gain may be increased by connecting multiple antenna elements to an RF path using a splitter (or a divider). The number of components which perform wireless communication is increasing to improve communication performance. Particularly, as the number of antennas, components, and RF parts (e.g., amplifiers and filters) configured to process RF signals received or transmitted via the antennas increases, so achieving the space gain and cost efficiency while satisfying communication performance is essentially required in configuring communication equipment.

A design method in which an antenna is implemented as a separate board (hereinafter referred to as an antenna board) is in progress. Through this, designing an antenna having high performance is possible while designing a main PCB at low cost in the mmWave bands (e.g., bands of FR2 of 3GPP). To attach the antenna board, a method such as a lamination or an assembly process using a solder ball or an adhesive pillar between antennas is used. However, a conventional solder ball attachment method such as a ball grid array (BGA) or a land grid array (LGA) is not easy to mass-produce due to a warpage problem (when the balance is changed, it is easy to break). Therefore, embodiments of the disclosure propose a lamination method using an adhesive material so as to solve such a problem. Hereinafter, the basic structure and related components of an electronic device having a detachable antenna structure to be proposed in the disclosure are described in FIGS. 2A and 2B.

Figure 2A:
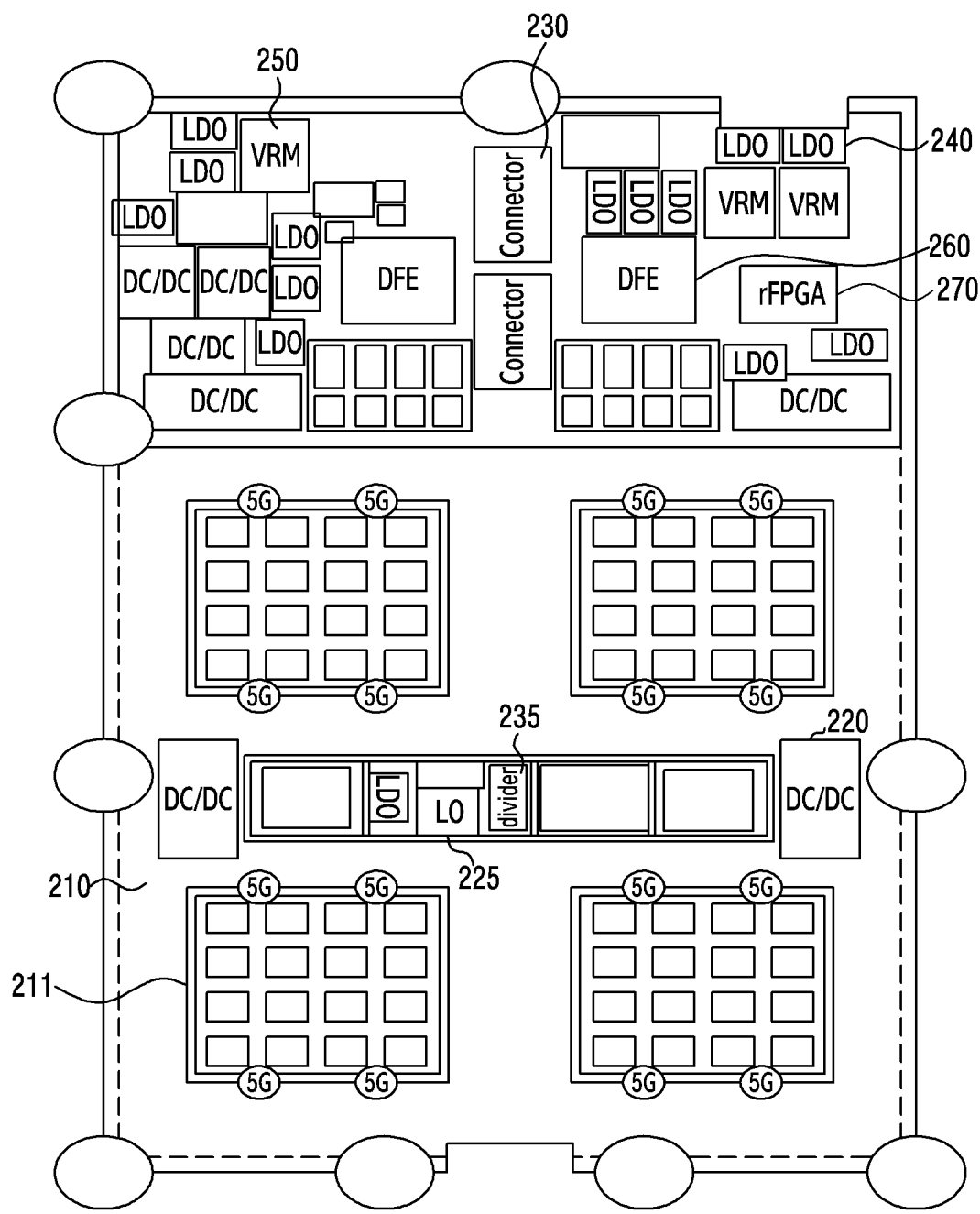
FIG. 2A shows an example of a radio frequency (RF) board according to an embodiment of the disclosure.

FIG. 2A shows an example of a RF board according to an embodiment of the disclosure. Embodiments of the disclosure relate to a communication device having a detachable antenna structure. A detachable antenna structure indicates a structure in which a PCB (hereinafter, a first PCB) on which an antenna is mounted and a PCB (hereinafter, a second PCB) on which an antenna module and components (e.g., a connector, a direct current (DC)/DC converter, and a digital front end (DFE)) configured to process a signal are mounted are separated and arranged. The first PCB may be referred to as an antenna board, an antenna substrate, a radiation substrate, a radiation board, or an RF board. The second PCB may be referred to as an RF board (or, radio unit (RU) board), a main board, a power board, a mother board, a package board, or a filter board.

Referring to FIG. 2A, the RF board 210 may include components configured to transmit a signal by a radiator (e.g., an antenna). According to an embodiment, one or more antenna PCBs (i.e., first PCBs) 211 may be mounted on the RF board 210. In other words, one or more antenna modules may be mounted on the RF board 210. A specific structure and configuration about an antenna module are described in FIGS. 2B, 3, 4A to 4C, 5, 6, 7, 8, 9A, 9B, 10, 11A, 11B, 12A, 12B, 13, 14A, and 14B to be described later.

The RF board may include components configured to supply an RF signal to an antenna. According to an embodiment, the RF board may include one or more DC/DC converters 220. The DC/DC converter 220 may be used to covert direct current to direct current. According to an embodiment, the RF board may include one or more local oscillators (LOs) 225. The LO 225 may be used to supply frequencies in an RF system. According to an embodiment, the RF board may include one or more connecters 230. The connecter may be used to transmit an electric signal. According to an embodiment, the RF board may include one or more dividers 235. The divider 235 may be used to distribute an input signal and transmit same to multipath. According to an embodiment, the RF board may include one or more low-dropout regulators (LDOs) 240. The LDO 240 may be used to suppress external noise and supply power. According to an embodiment, the RF board may include one or more voltage regulator modules (VRMs) 250. The VRM 250 may indicate a module configured to ensure that an appropriate voltage is maintained. According to an embodiment, the RF board may include one or more digital front ends (DFEs) 260. According to an embodiment, the RF board may include one or more radio frequency programmable gain amplifiers (rFPGAs) 270. According to an embodiment, the RF board may include one or more intermediate frequencies (IFs). As a configuration shown in FIG. 2A, some components among parts shown in FIG. 2A may be omitted or a greater number of parts may be mounted. In addition, although not mentioned in FIG. 2A, the RF board may further include an RF filter configured to filter a signal.

Figure 2B:
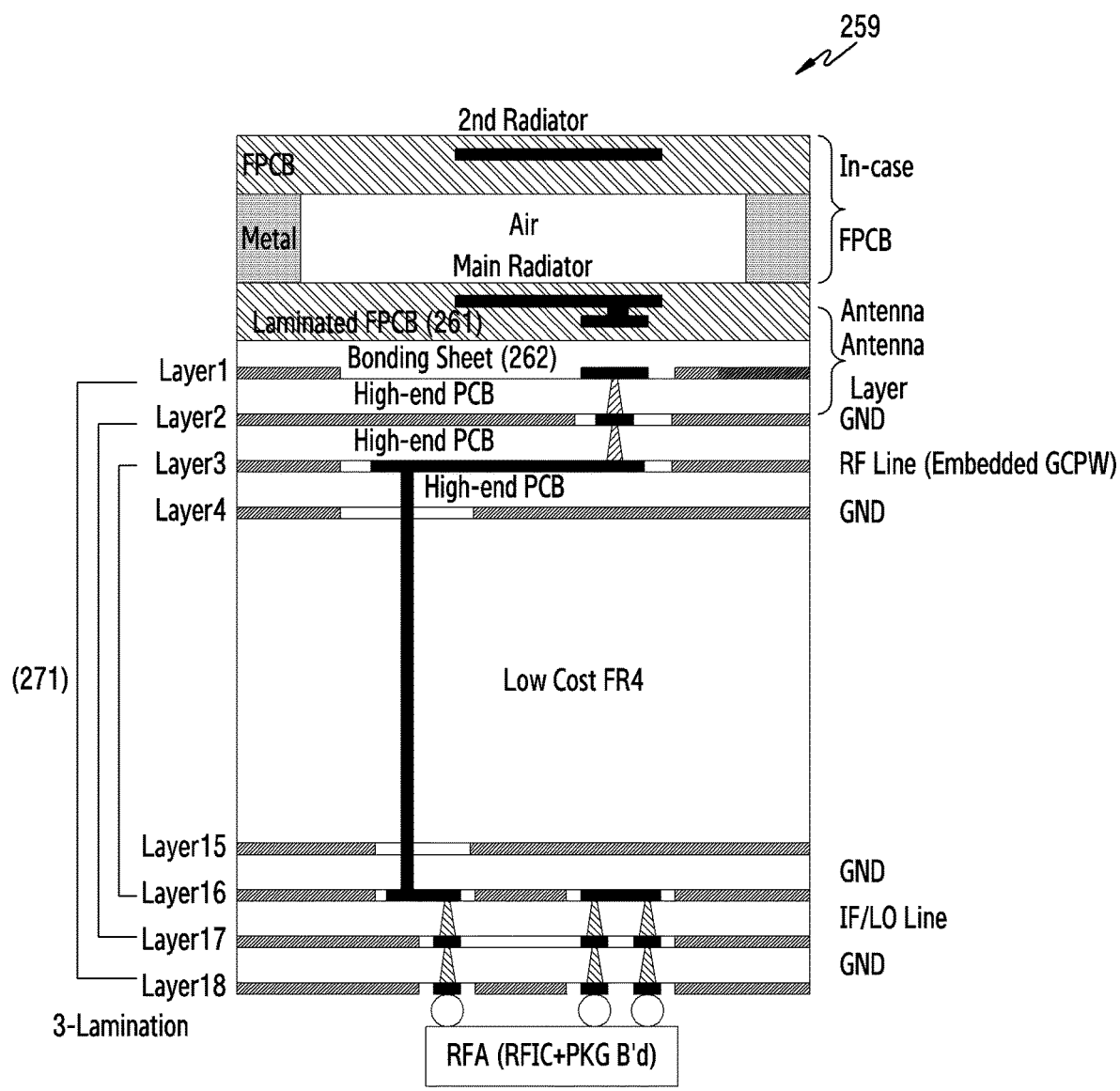
FIG. 2B shows an example of a cross section of an electronic device having a detachable antenna structure according to an embodiment of the disclosure.

FIG. 2B shows an example of a cross section of an electronic device having a detachable antenna structure according to an embodiment of the disclosure. The detachable antenna structure indicates a structure in which a PCB (hereinafter, a first PCB) on which an antenna is mounted and a PCB (hereinafter, a second PCB) on which an antenna module and components (e.g., a connector, a direct current (DC)/DC converter, and a DFE) configured to process a signal are mounted are separated and arranged. The first PCB may be referred to as an antenna board, an antenna substrate, a radiation substrate, a radiation board, or an RF board. The second PCB may be referred to as an RF board, a main board, a package board, a mother board, or a filter board. In the disclosure, communication equipment in which a PCB (hereinafter, a third PCB) on which the first PCB, the second PCB, and a radio frequency integrated circuit (RFIC) are mounted is separated and disposed is described as an example.

Referring to FIG. 2B, a detachable antenna structure 259 indicates a structure in which a FPCB 261 on which a radiator (e.g., an antenna) is disposed is disposed on a substrate layer independent of PCB 271. In embodiments of the disclosure, the FPCB 261 and the PCB 271 are arranged on independent substrate layers, respectively. According to an embodiment, the FPCB 261 may be a flexible printed circuit board (FPCB) laminated to radiate radio waves. An antenna may be disposed on the FPCB 261. According to an embodiment, the FPCB 261 may be manufactured to have a detachable structure in a manufacturing process, and thus an area in which an antenna is mounted may be reduced, thereby increasing space efficiency of communication equipment. To facilitate attachment/detachment, an adhesive material 262 may be used. In addition, in a case where the adhesive material 262 is tape, the FPCB 261 serving as an antenna PCB may be easily attached or detached even after a heat/compression process. In other words, after the heat/compression process, even though the FPCB 261 is not attached/detached, the first PCB may be bonded to the second PCB via a preliminarily bondable adhesive material, and thus a structure configured to improve manufacturing efficiency may also be understood as an embodiment of the disclosure.

The PCB 271 may include PCBs in which a plurality of substrates are stacked. Via holes may be formed across layers of the PCB 271. For example, the PCB 271 may include a via hole configured by a laser process and a via hole configured by a plated through hole (PTH) process. According to an embodiment, the second PCB may include a low cost layer configured of FR4 for a coaxial PTH. According to an embodiment, a feeding unit may be included on one surface of the PCB 271. In some additional embodiments, an additional antenna (a second antenna of FIG. 2B) may be disposed in addition to a main antenna of the FPCB 261. In addition, according to an embodiment, the PCB 271 may be manufactured via a three-step lamination process. The PCB 271 may be produced via a vertically symmetrical lamination process with reference to a low-cost layer. The PCB 271 may include one or more ground layers. On layer 3 (L3), an RF line may include an embedded grounded co-planar waveguide (GCPW). In addition, according to an embodiment, the antennas may be spaced a pre-configured length apart from each other by a cover configured of a non-metal material. According to an embodiment, the performance of an antenna module may be determined based on the separation distance between the antenna of the FPCB 261 and the antenna of the cover.

According to embodiments of the disclosure, a coupling unit configured to receive an electrical signal from the feeding unit of the PCB 271 to radiate radio waves may be disposed on the FPCB 261. In other words, according to the antenna module structure disclosed herein, the coupling unit and the feeding unit may have a coupling structure without direct connection. In addition, according to the antenna module structure disclosed herein, the coupling unit and the feeding unit have a coupling structure in which the coupling unit and the feeding unit are not directly connected, but the FPCB 261 may be laminated on the PCB 271 to allow the coupling unit and the feeding unit to be arranged so that a constant distance is maintained between the coupling unit and the feeding unit.

In a detachable antenna structure, a coupling may be used for electrical connection. Alignment of the coupling unit and the feeding unit is required for stable coupling connection. For high-precision coupling connection, lamination and press processes using an adhesive material are necessarily required. Embodiments of the disclosure propose a detachable antenna structure in which an antenna board and an RF board are attachable to and detachable from each other, using an adhesive material such as a bonding sheet or tape. In addition, embodiments of the disclosure propose a shape of a coupling unit required for an antenna board so as to provide stable coupling connection between the antenna board and the RF board. Hereinafter, factors of each structure configuring a detachable antenna structure will be described with reference to FIG. 3.

Figure 3:
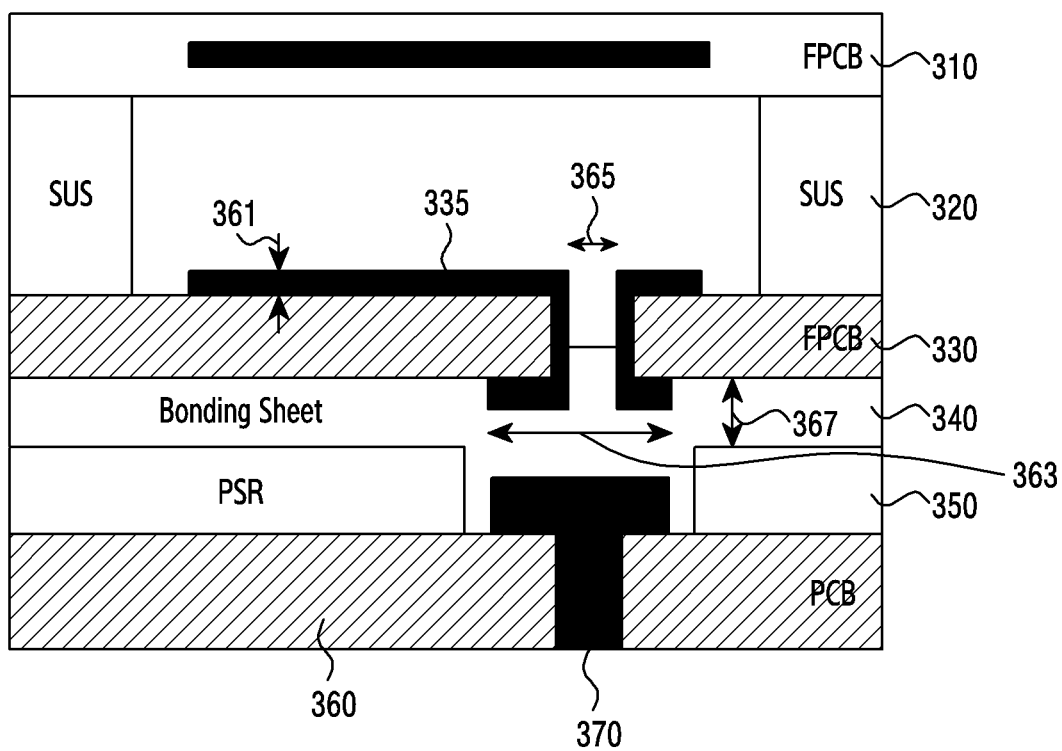
FIG. 3 shows an example of a detachable antenna structure according to an embodiment of the disclosure.

FIG. 3 shows an example of a detachable antenna structure according to an embodiment of the disclosure. The detachable antenna structure indicates a structure in which a first PCB on which an antenna is mounted and a second PCB on which an antenna module and components configured to process a signal are mounted are separated and arranged.

Referring to FIG. 3, as a first PCB, an FPCB is described as an example, but such an example is not construed as limiting other embodiments of the disclosure. An antenna board of a general PCB, which is not an FPCB, may also be understood as an embodiment of the disclosure.

Referring to FIG. 3, an antenna module may include a cover 310, a support (SUS) 320 of the cover 310, an FPCB 330 on which an antenna is mounted, a bonding sheet 340 configured to bond an antenna board to an RF board, and a photo solder resist (PSR) 350, a PCB 360 on which RF components are mounted, and a through hole 370 through which signals are transmitted. The FPCB 330 may be attached to a coupling structure 335 so as to be electrically connected to the PCB 360. The coupling structure 335 may be disposed on the FPCB 330. The PCB 35 may include a coupling pad 375 connected to the through hole 370.

The alignment of the coupling structure 335 and the coupling pad 375 of the PCB 360 affects coupling connection. The coupling connection may affect antenna performance. In a case where misalignment of the coupling structure 335 and the coupling pad 375 of the PCB 360 occurs, a gain value may be changed. The alignment of the coupling structure 335 and the coupling pad 375 of the PCB 360 affects an antenna gain. As an example, a gain due to the misalignment of the coupling structure 335 and the coupling pad 375 may be shown in Table 1 below.

TABLE 1

| Degree of misalignment (mm) | Gain (dBi) (16 chains) |
| --- | --- |
| 0 | 17.1 |
| 0.1 | 17.0 |
| 0.15 | 16.9 |
| 0.2 | 16.7 |

The detachable antenna structure may be designed so that performance error (i.e., tolerance) due to the misalignment is to be met up to a predetermined criterion (e.g., 200 micrometer (μm)). In order to control the misalignment, high accuracy is required in coupling the FPCB 330 and the PCB 360. A press process may be used to implement an ultra-precision process. One surface of the FPCB 330 may be disposed to correspond to one surface of the PCB 360, and then the two surfaces may be vertically pressed. At the time of bonding the FPCB 330 and the PCB 360 by using a solder ball such as BGA or LGA, cracking is likely to occur due to pressure. Therefore, in the disclosure, at the time of connecting the FPCB 330 and the PCB 360, coupling connection may be performed by using an adhesive material (e.g., a bonding sheet 340 or an adhesive). Energy coupling may be performed via an adhesive material. For stable coupling connection and mass productivity between the FPCB 330 and the PCB 360, that is, the antenna board and the RF board, several design constraints exist. Hereinafter, at the time of designing a detachable antenna structure for coupling connection, design factors used in embodiments of the disclosure will be described. The PCB may include a plurality of substrate layers. Such substrate layers indicate layers configured of metal (e.g., copper). The PCB may include a plurality of metal layers. For convenience of description, the uppermost metal layer of the PCB is referred to as a first metal layer, and the lowermost metal layer of the PCB is referred to as a second metal layer. At the time of manufacturing the PCB, via holes are formed across the layers so as to electrically connect the layers to each other. Then, for electrical conduction, the via holes may be plated. A structure configured by plating may be formed along the first metal layer, the second metal layer, and the via holes. The structure thus formed may provide coupling connection with another PCB.

According to an embodiment, a plating thickness 361 affects components of the FPCB 330. When the FPCB 330 and the PCB 360 are coupled, a compression process may be performed. In a case where the heat of the compression process being performed is too high, the pressure is too high, or the compression time is longer than the standard, a defect may occur in a coupling structure of the FPCB 330 and the PCB 360. For example, an adhesive material may be excessively spread to cause resin flow to occur. In addition, for example, a crack may occur at a plated portion of the FPCB 330. In an example, at the time of one-time plating, a crack may occur at a plated portion for a coupling pad. Such a crack deforms the shape of the coupling structure, and thus misalignment may occur. According to an embodiment, the plating thickness 361 or the number of plating may be increased so as to increase thermal shock reliability. The plating thickness 361 is dependent on the number of plating. For example, the plating thickness may be required to be at least 20 μm. For example, the number of plating may be required at least two times.

According to an embodiment, the width 363 of the coupling structure 335 affects components of the FPCB 330. The coupling structure 335 may be configured of at least one among a metal layer and copper plating. The coupling structure 335 may provide electrical connection to a radiator. The coupling structure 335 may provide coupling connection to the PCB 360. The width 363 of the coupling structure 335 affects alignment with the coupling pad of the PCB 360. As coupled areas, that is, the facing areas increase, the radiation gain may be increased. As the alignment error between the coupled areas increases, the gain decreases.

According to an embodiment, the size of a via hole 365 of the PCB is dependent on the thickness of an adhesive material adjusting a gap between coupling pads. According to an embodiment, the gap 367 between the FPCB 330 and the PCB 360 is dependent on the thickness of the adhesive material (or a bonding sheet 340). For example, the thickness of the adhesive material is dependent on the size of a via PTH hole configured to feed the antenna. The thickness of the adhesive material may be used to determine the size of the PTH hole. In order to implement an actual gap between coupling pads to be 10 to 50 μm, the thickness of the adhesive material may be variously selected from 25 to 100 μm for each type of antenna. A specific example for each type of antenna will be described in FIG. 6. The thickness of an adhesive material is a main design factor which determines the distance between a radiator and the ground.

Pressure corresponding to the distance between the FPCB 330 and the PCB 360 is applied to the adhesive material (or a bonding sheet 340). High pressure decreases the distance between the FPCB 330 and the PCB 360, and a short distance increases coupling performance. High coupling performance is required to implement a detachable antenna structure, and thus a compression process is important. Excessive pressure weakens the durability of the coupling structure. Weak durability is not suitable for mass production, and thus mm Wave communication equipment requiring a large number of antennas requires an antenna module having high mass production reliability. Therefore, embodiments of the disclosure propose components of a PCB to increase mass production reliability while providing stable coupling connection in consideration of the above-described design factors.

Figure 4A:
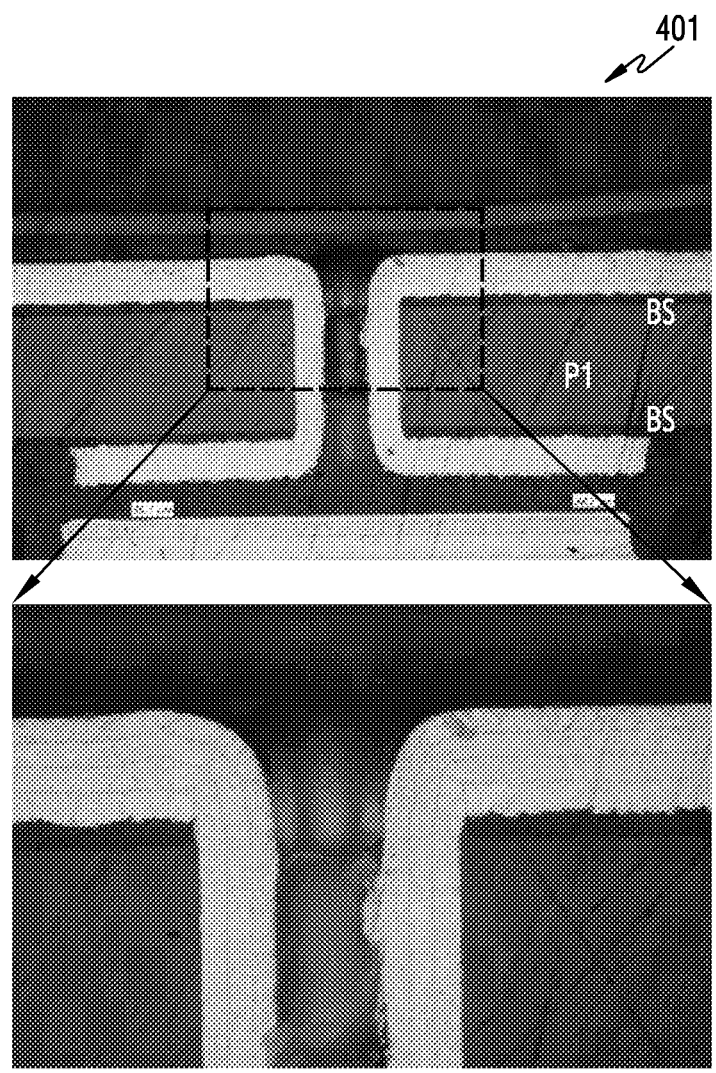
FIGS. 4A, 4B, and 4C are views showing an example of a flexible printed circuit board (FPCB) of a detachable antenna structure according to various embodiments of the disclosure.
Figure 4B:
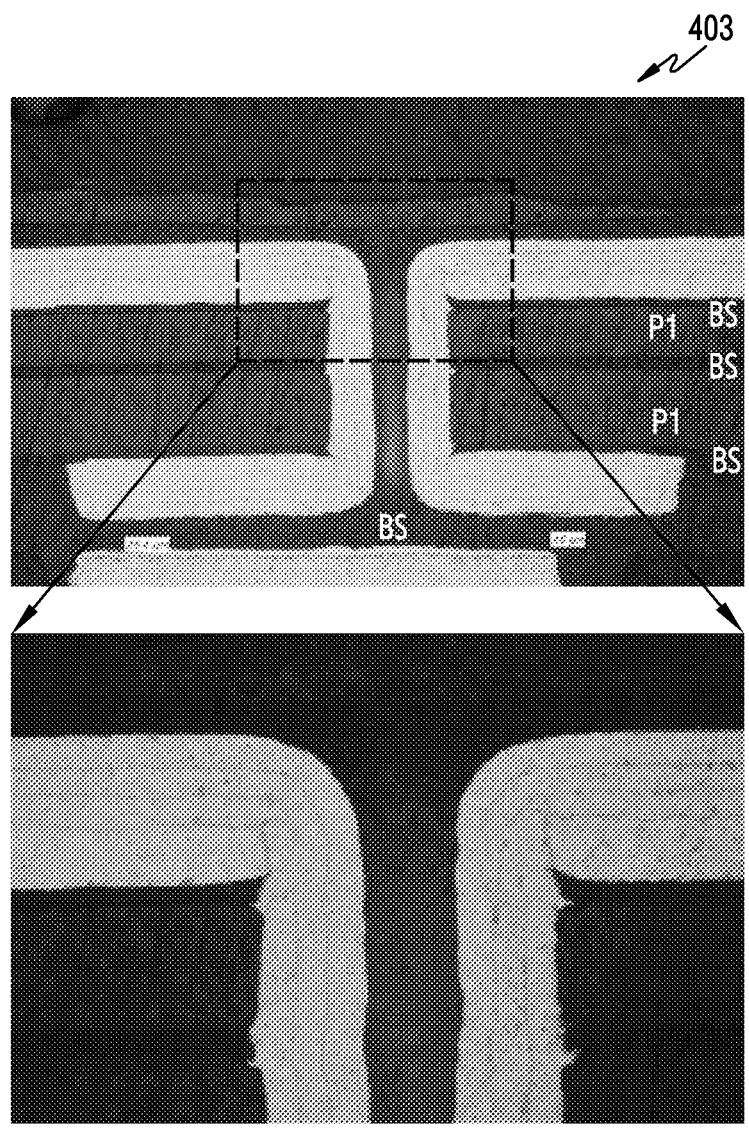
Figure 4C:
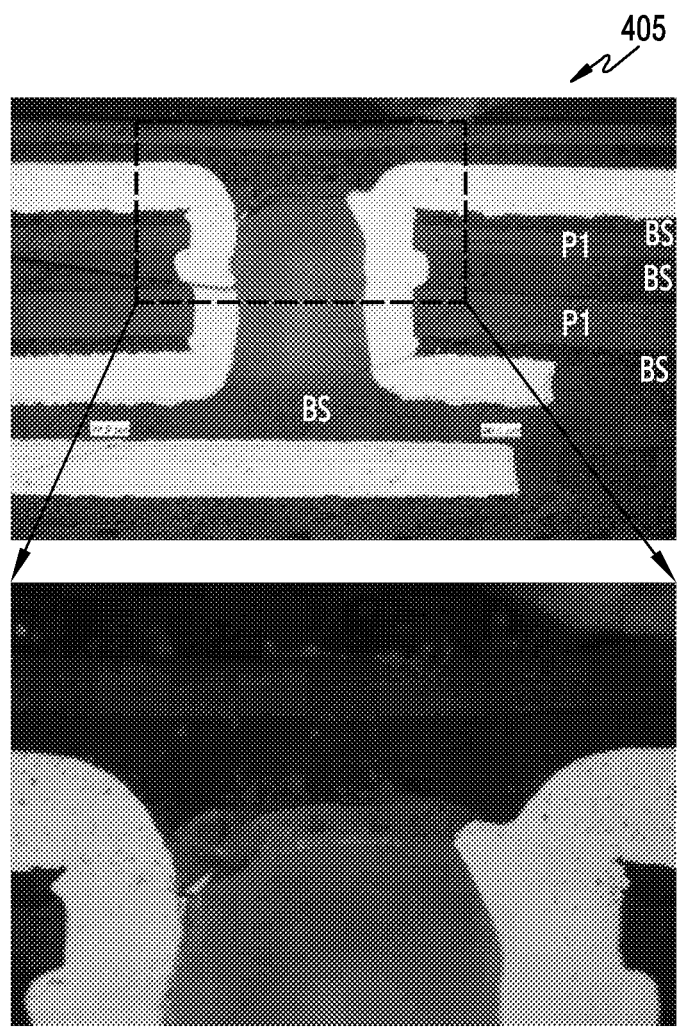

FIGS. 4A, 4B, and 4C are views showing an example of a flexible printed circuit board (FPCB) of a detachable antenna structure according to various embodiments of the disclosure.

The FPCB may include one or more metal layers. In the FPCB, plating may be used to conduct electricity between layers. According to an embodiment, a copper plating treatment may be performed on the FPCB. The copper plating may be referred to as copper foil. According to an embodiment, the FPCB may include flexible copper clad laminate (FCCL). The FCCL may be in a form of combining a flexible polyester film, a polyimide (PI) film, or the like with copper foil by using an adhesive (e.g., bonding sheet, acrylic adhesive). The FCCL or FPCB manufacturing process is a roll-to-roll process, high-temperature chemicals are used even while receiving tension, and thus a PI film which maintains properties without changing during the process may be used for embodiments of the disclosure.

Referring to FIG. 4A, a first example 401 of the FPCB for a detachable antenna structure is shown. According to an embodiment, the FPCB may include a PI layer configured by one body. Mass productivity may be increased due to single-body PI. A first bonding sheet may be disposed on the upper surface of the PI layer as an adhesive. A second bonding sheet may be disposed on the lower surface of the PI layer as an adhesive. A first metal layer may be disposed on the first bonding sheet. As an example, the first metal layer may be configured of copper. A second metal layer may be disposed under the second bonding sheet. As an example, the second metal layer may be configured of copper. Via holes may be formed between layers for conduction between the first metal layer and the second metal layer. Thereafter, plating may be formed across the first metal layer, the second metal layer, and the via holes. The thickness of an adhesive material between the first PCB and the second PCB may be determined depending on the gap between coupling pads.

Referring to FIG. 4B, a second example 403 of the FPCB for a detachable antenna structure is shown. A plating process may be additionally performed to increase thermal shock reliability. According to an embodiment, the coupling structure may include a plurality of plating layers according to a plating process. As the relative robustness increases due to the increase in plating thickness, the FPCB may include a plurality of PI layers for miniaturization and high densification. According to an embodiment, the FPCB may include a plurality of PI layers. Due to the plurality of PI layers, miniaturization and high densification of the FPCB may be achieved. The distance between the FPCB and the main PCB may be reduced.

Referring to FIG. 4B, as a dielectric, PI has been described as an example, but embodiments of the disclosure are not limited thereto. As a dielectric of the FPCB, dielectrics of polyethylene terephthalate (PET) or polyamide (PA) may be used in addition to PI. In addition, according to an embodiment, other types of PCBs may be used for arrangement of antennas, besides the FPCB. For example, a rigid PCB may be used for arrangement of antennas. As a dielectric configuring a rigid PCB, pre-impregnated materials (Prepreg), copper clad laminate (CCL), or low temperature co-fired ceramic (LTCC) may be used. Hereinafter, in the disclosure, a dielectric layer configuring a PCB through a PI film is described, but various types of dielectrics, such as films, sheets, and composite materials, implemented of a polymer or ceramic material, may also be used to implement embodiments of the disclosure.

Referring to FIG. 4C, a third example 405 of the FPCB for a detachable antenna structure is shown. The size of via holes passing through substrate layers of the FPCB may affect the thickness of an adhesive material. If the size of the via hole is large, the amount of an adhesive material required for stable connection of the PI layer and plating layer of the FPCB may increase. If the filling of the adhesive material is satisfied, in a case where the size of the via hole is larger than that of the first example 401, the thickness of the adhesive material may be relatively thick. As an example, if the size of a via hole having a diameter (Ø) of 0.2 mm or more and the filling of the adhesive material are satisfied, the FPCB may be implemented with a bonding sheet having a thickness of 25 μm.

Figure 5:
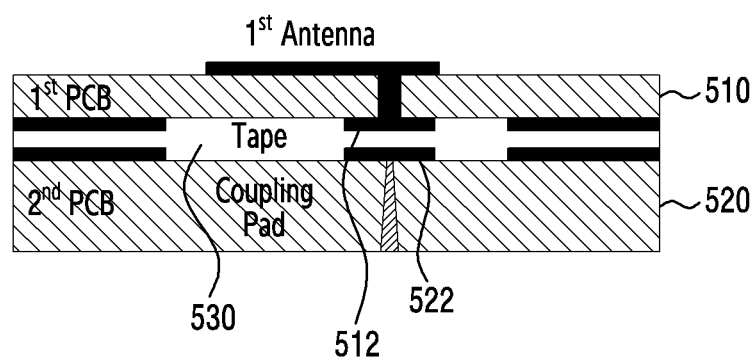
FIG. 5 shows an example of a detachable antenna structure using tape according to an embodiment of the disclosure.

FIG. 5 shows an example of a detachable antenna structure using tape according to an embodiment of the disclosure.

Referring to FIG. 5, embodiments in which adhesive tape, not a bonding sheet, is used as an adhesive material are described. The first PCB, which is an antenna board shown in FIG. 5, is exemplary, and the first PCB according to the embodiments described in FIGS. 3 and 4A to 4C may be equally applied to FIG. 5.

Referring to FIG. 5, a first PCB 510 and a second PCB 520 may be coupled via an adhesive material. According to an embodiment, the adhesive material may include a tape 530. The first PCB 510 and the second PCB 520 may be coupled while having the tape 530 interposed therebetween. The first PCB 510 may be coupled to the tape 530 at a first surface of the first PCB 510. A second surface of the first PCB 510 may be a surface on which an antenna is mounted. In other words, a side opposite to the radiation surface of the first PCB 510 may be coupled to the tape 530. The second PCB 520 may be coupled to the tape 530 at a first surface of the second PCB 520. A second surface of the second PCB 520 may be directly coupled to a package of an RFIC (not shown), or may be coupled to a board on which the RFIC is mounted.

The first PCB 510 and the second PCB 520 may be electrically connected to each other. The electrical connection may be coupling connection. Energy coupling may be performed via the adhesive material (e.g., tape 530). The first PCB 510 may include a coupling structure. For example, the first PCB 510 may include a coupling pad 512. The second PCB 520 may include a coupling structure. For example, the second PCB 520 may include a coupling pad 522. Two coupling pads may be aligned for high gain. The second PCB 520 may include a feed line configured to transmit a signal from the coupling pad 522 to the RFIC.

The coupling process of the first PCB and the second PCB of the disclosure may include a pre-bonding procedure in which the first PCB bonding structure (the result of combining the first PCB and the adhesive material) and the second PCB are simply coupled, and a main bonding procedure in which a press process is performed after the pre-bonding process. According to an embodiment, if tape is used as an adhesive material, unlike bonding sheets, a general compression process may be used instead of hot-pressing. A coupling structure may be formed via a compression process. In the coupling structure, the first PCB 510, the tape 530, and the second PCB 520 may be stacked in the order. The coupling structure formed by the tape 530 is advantageous in that separation thereof is easy. Even after the main bonding, eliminating the coupled components of the tape 530 and the first PCB 510 is possible, and thus when misalignment occurs, the existing coupled components may be replaced with other coupled components (the coupled components of the first PCB 510 and the tape 530).

Figure 6:
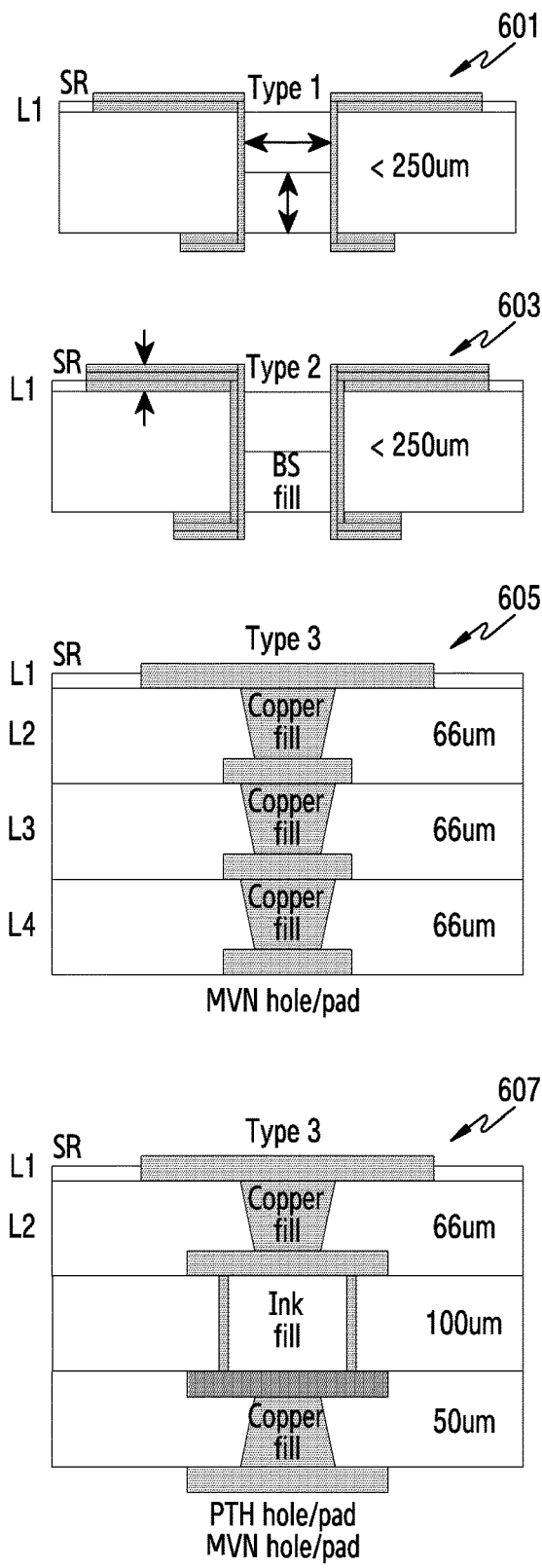
FIG. 6 shows an example of bonding sheets and via holes according to an embodiment of the disclosure.

FIG. 6 shows examples of forming a coupling structure according to an embodiment of the disclosure. A coupling structure may be formed at one surface of a PCB. In the disclosure, a coupling structure may indicate a structure disposed on each PCB for coupling connection between two PCBs (e.g., a first PCB on which an antenna is mounted and a second PCB on which a feeding unit and other RF components are mounted). Coupling pads may be arranged on a surface of each PCB. The PCB described in FIG. 6 may be applied to the first PCB or the second PCB.

Referring to FIG. 6, various coupling structures may be formed on the PCB depending on the thickness, the number of plating, the type of via holes, and the presence or absence of a bonding sheet. The number of plating of the PCB having a first structure 601 may be one time. A plating process is performed for electrical conduction between an upper substrate layer and a lower substrate layer of the PCB. The PCB may include a via hole. According to an embodiment, plating may include copper plating. The number of plating of the PCB having a second structure 603 may be two times or more. In other words, the number of plating of the PCB having the second structure 603 may increase, compared with the PCB having the first structure 601. The number of plating is related with the plating thickness. In a case where the plating thickness is thin, cracks are likely to occur during coupling, and thus additional plating treatment may be required depending on the situation. As the plating thickness increases, defects are not likely to occur during a press process, which is a process of the main bonding procedure, and the possibility of mass production increases. In other words, the coupling between the first PCB and the second PCB may be more robust. According to an embodiment, depending on the amount or thickness of the bonding sheet filled in the interior, the size of the via to be plated may vary. If the size of the via and the amount of the bonding sheet are sufficient, the coupling structure in the PCB may be implemented even if the thickness of the bonding sheet is large. According to an embodiment, the PCB may have a multi-layer structure. In a PCB having a multi-layer structure, via holes are formed across multiple layers. The PCB having a third structure 605 may use metal (e.g., copper) to prevent deformation of via holes. The via hole area is filled with metal. The PCB having a fourth structure 607 may use ink to prevent deformation of via holes. The via hole area is filled with ink as well as metal (e.g., copper).

Figure 7:
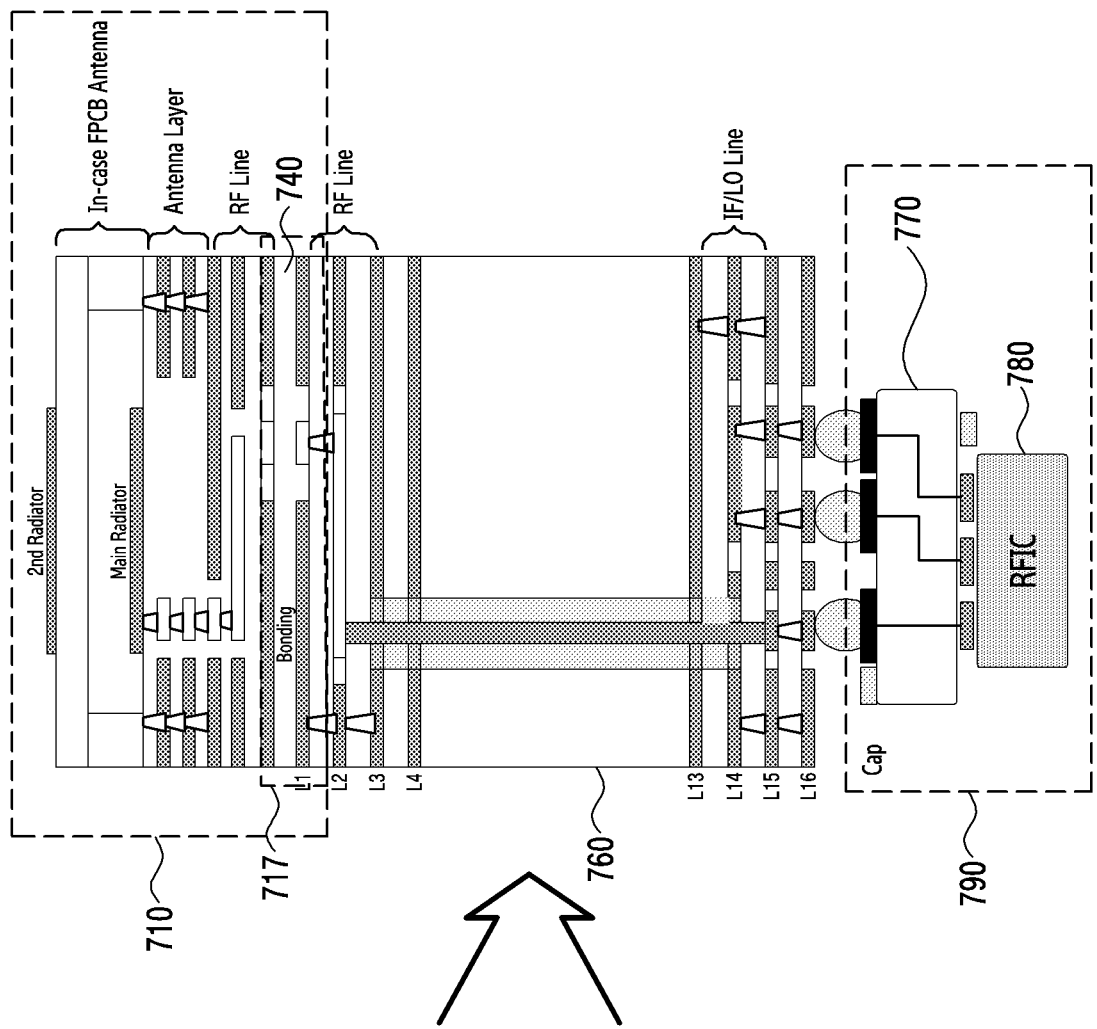
FIG. 7 shows an example of an electronic device including a detachable antenna structure according to an embodiment of the disclosure.
Figure 7:
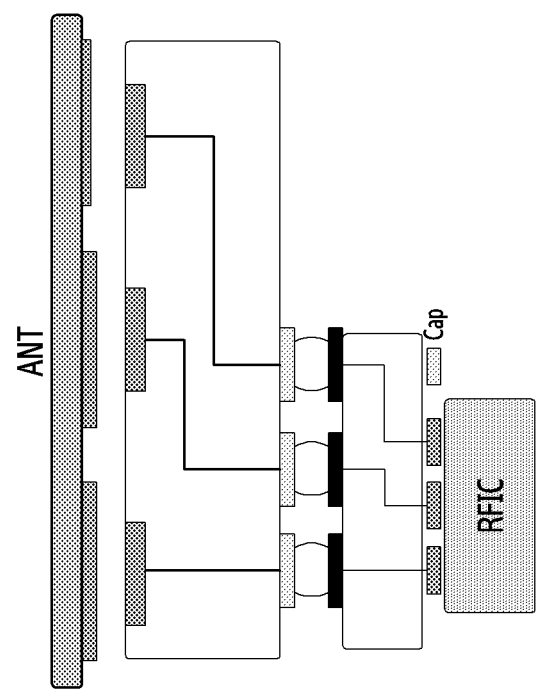

FIG. 7 shows an example of an electronic device including a detachable antenna structure according to an embodiment of the disclosure. A detachable antenna structure indicates a structure in which an antenna radiation layer and a dielectric layer are separated from each other. In other words, the detachable antenna structure indicates a structure in which an RF board configured to transmit a signal transmitted from an RFIC to a radiation layer and an antenna board configured to radiate the processed signal in the air are separated from each other.

Referring to FIG. 7, a detachable antenna structure 710 may include a first PCB, an adhesive material 740, and a second PCB 760. The detachable antenna structure may include a structure for coupling connection 717. A lower substrate of the antenna board may include a coupling structure. An upper substrate of the RF board may include the coupling structure. The coupling structure may include coupling pads. According to an embodiment, as an adhesive material 740, a thermosetting bonding sheet may be used for high-temperature compression. In addition, according to an embodiment, as an adhesive material, a pressure-sensitive adhesive (PSA) for low-temperature compression or roll compression may be used. A PSA is a pressure-sensitive adhesive, and is an adhesive in which an adhesive material works when pressure is applied to bond the adhesive to an adhesive surface. The strength of adhesion is affected by the amount of pressure that causes the adhesive to be applied to a surface. According to an embodiment, the PSA may usually be formulated to maintain adequate adhesion and durability at room temperature. According to another embodiment, there are also adhesives which are made to work normally even at low or high temperatures.

An antenna of a radiation layer of an antenna board may be configured in various manners. According to an embodiment, the antenna may be implemented as a PCB-less antenna. According to an embodiment, the antenna may include a foldable endfire antenna. According to an embodiment, the antenna may be a modular antenna. According to an embodiment, the antenna may be a wide-aperture antenna. According to an embodiment, the antenna may be a highly insulated antenna.

The second PCB 760 may include a plurality of layers. The second PCB 760 may include a feeding unit configured to transmit a signal processed via an RFIC 780 to an antenna radiation layer. The second PCB 760 may transmit an RF signal to an antenna radiator via a plurality of substrate layers. According to an embodiment, the second PCB 760 may include a vertical PTH for low loss.

On the second PCB 760, various components for RF signal processing may be mounted, in addition to an area in which circuits including an antenna radiation layer are mounted. The second PCB 760 may be referred to as an RF board, a main board, a package board, a mother board, or a filter board. For example, a DC/DC converter may be disposed on the second PCB 760. For example, an RF filter may be disposed on the second PCB 760. For example, a power supply may be disposed on the second PCB 760. For example, an LDO may be disposed on the second PCB 760. For example, a divider may be disposed on the second PCB 760. For example, an FPGA may be disposed on the second PCB 760. In FIG. 7, in order to explain a cross section of a laminated structure, the second PCB is shown to have the same width as the first PCB, but as shown in FIG. 2A, the second PCB may have a larger area than the first PCB in order to process a plurality of antenna modules and a plurality of RFICs. Similarly, the second PCB may have a larger area than a third PCB 770 to be described later.

The third PCB 770 may be a PCB configured to mount the RFIC 780 thereon. According to an embodiment, the third PCB 770 may be coupled to the second PCB via a grid array. The grid array may include BGA or LGA. One surface of the third PCB 770 may be coupled to the second PCB 760 via the grid array. Another surface of the third PCB 770 may be coupled to the RFIC. In addition, according to an embodiment, one surface of the third PCB 770 may include a capacitor. The capacitor may be disposed on one surface of the third PCB 770 so as to remove noise occurring during signal transmission. Like the second PCB 760 and the third PCB 770, a structure in which the RFIC is disposed on a board separate from the second PCB, which is a main board, may be referred to as a detachable package structure 790. Referring to FIG. 7, in order to explain a cross section of a laminated structure, the second PCB and the third PCB are shown one by one, but as shown in FIG. 2A, the second PCB may have a larger area than the third PCB 770 in order to process a plurality of antenna modules and a plurality of RFICs.

Referring to FIG. 7, embodiments in which a package having an RFID mounted therein is configured independently of other boards have been described, but embodiments of the disclosure are not limited thereto. Unlike FIG. 7, if a communication equipment has a detachable antenna structure, the communication equipment having a structure in which the RFIC 780 is directly mounted on the second PCB 760 may also be understood as an embodiment of the disclosure.

Referring to FIGS. 2A, 2B, 3, 4A to 4C, 5, 6, and 7, a detachable antenna structure in which an antenna radiation layer and a dielectric layer are implemented as separate components to ensure antenna performance has been described. By separately implementing an antenna board and a main board, designing an antenna board configured to provide high performance is possible and a main board may be more efficiently designed. Coupling connection and alignment arrangement of each coupling structure are required to have a detachable antenna structure. Referring to FIGS. 3, 4A to 4C, 5, and 6, design factors and specifications of an FPCB to increase mass production reliability in ultra-precision processes have been described. Hereinafter, referring to FIGS. 8, 9A, 9B, 10, 11A, 11B, 12A, 12B, 13, 14A, and 14B, processes configured to manufacture the above-described detachable structure and structures therefor will be described.

Figure 8:
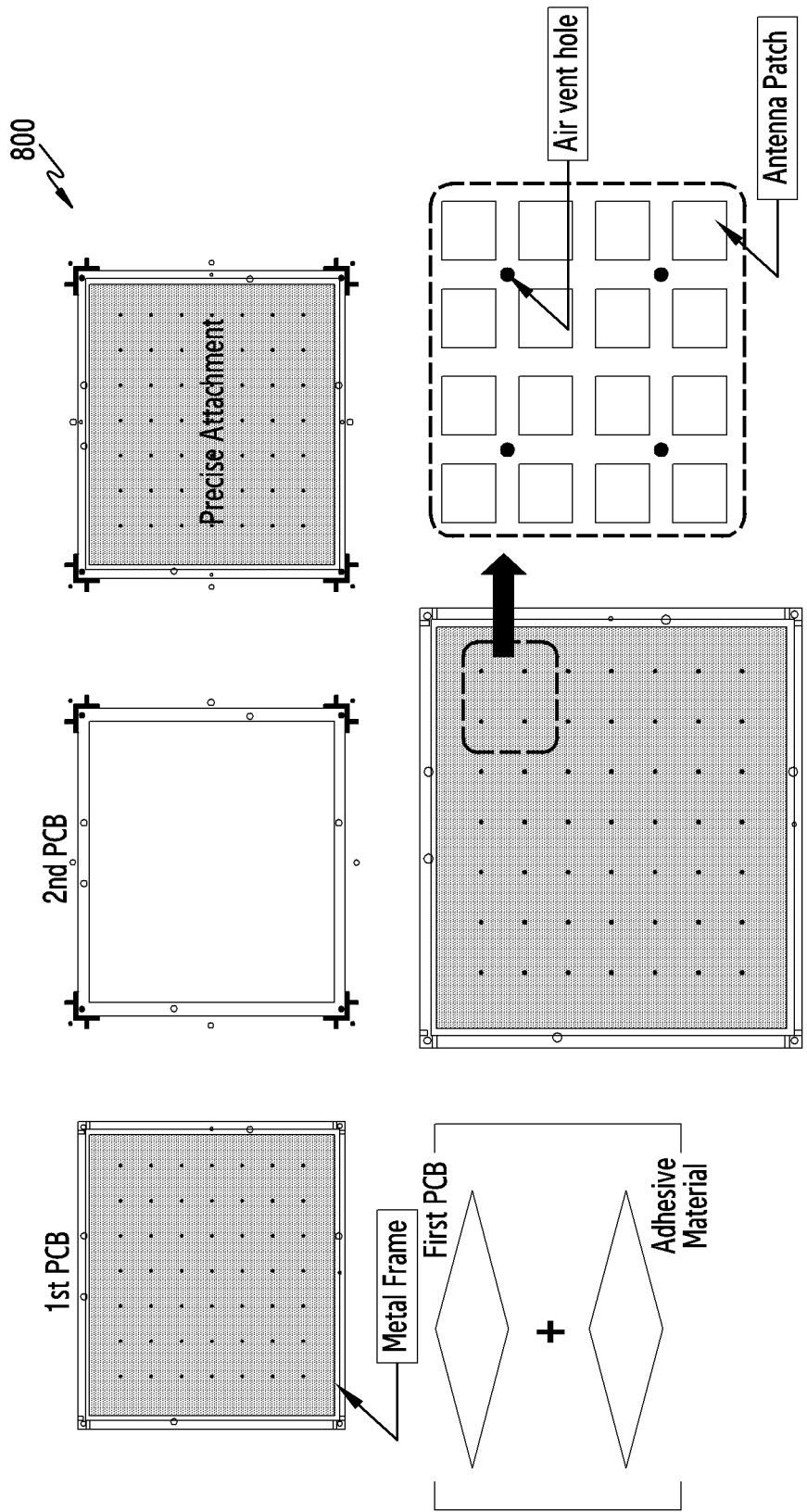
FIG. 8 shows an example of attachment of an antenna board and a radio frequency (RF) board according to an embodiment of the disclosure.

FIG. 8 shows an example of attachment between an antenna board and an RF board according to an embodiment of the disclosure. An antenna board is a PCB on which an antenna is disposed, and may be referred to as a first PCB. An RF board is a PCB on which an RF feeding line and power supply components are arranged, and may be referred to as a second PCB.

Referring to FIG. 8 depicting an example 800, in a detachable antenna structure, it is required to accurately attach the first PCB and the second PCB using an adhesive material in order to minimize misalignment of the coupling connection. According to embodiments of the disclosure, the first PCB or the second PCB may include structures configured to assist precise coupling between PCBs. According to an embodiment, the adhesive material may be assembled to the first PCB before pre-bonding. According to an embodiment, for precise pre-bonding of the first PCB and the second PCB, fiducial marks may be positioned on the first PCB and the second PCB. The first PCB may include one or more fiducial marks. The second PCB may include one or more fiducial marks. According to an embodiment, at the time of main bonding (e.g., hot-press), a vent hole may be positioned in the first PCB so as to prevent air traps. The first PCB may include one or more vent holes. According to an embodiment, a metal frame may be positioned on the first PCB so as to maintain dimensional change enhancement. The metal frame may be disposed to surround the first PCB. The metal frame may optionally be used, and thus in some embodiments, the metal frame may not be used.

Figure 9A:
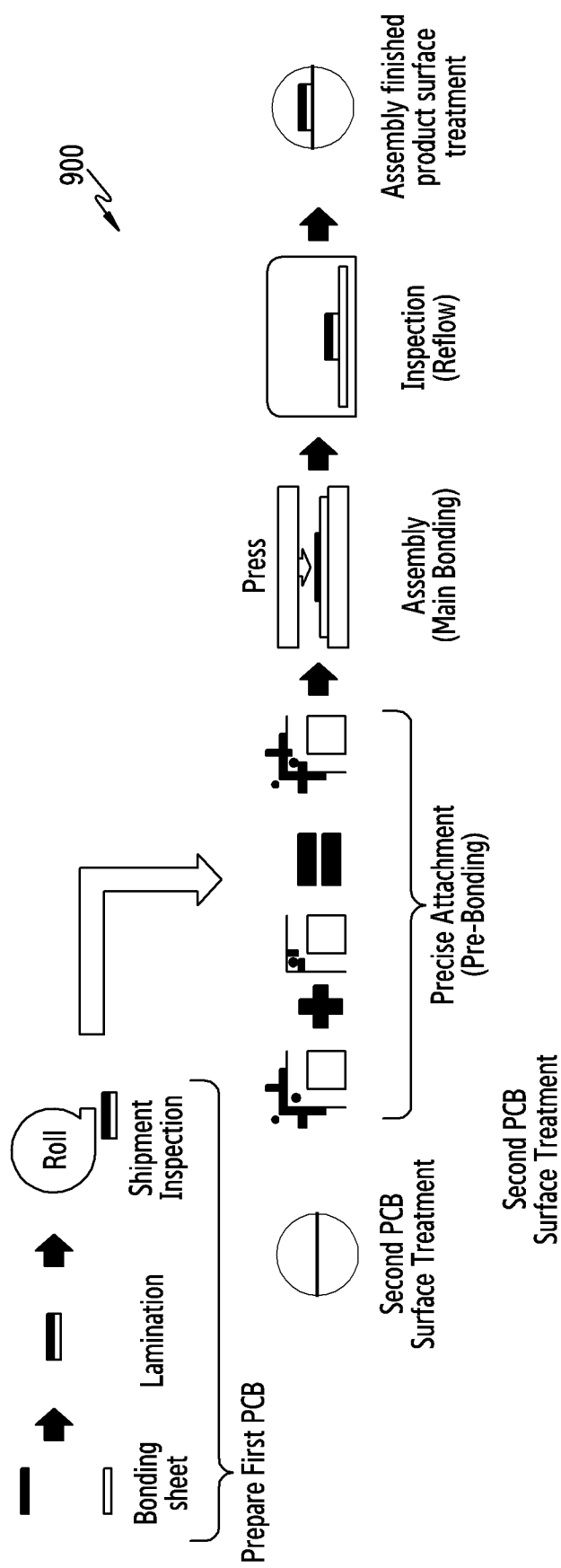
FIGS. 9A and 9B are views showing an example of an assembly process of an antenna board and an RF board according to various embodiments of the disclosure.
Figure 9B:
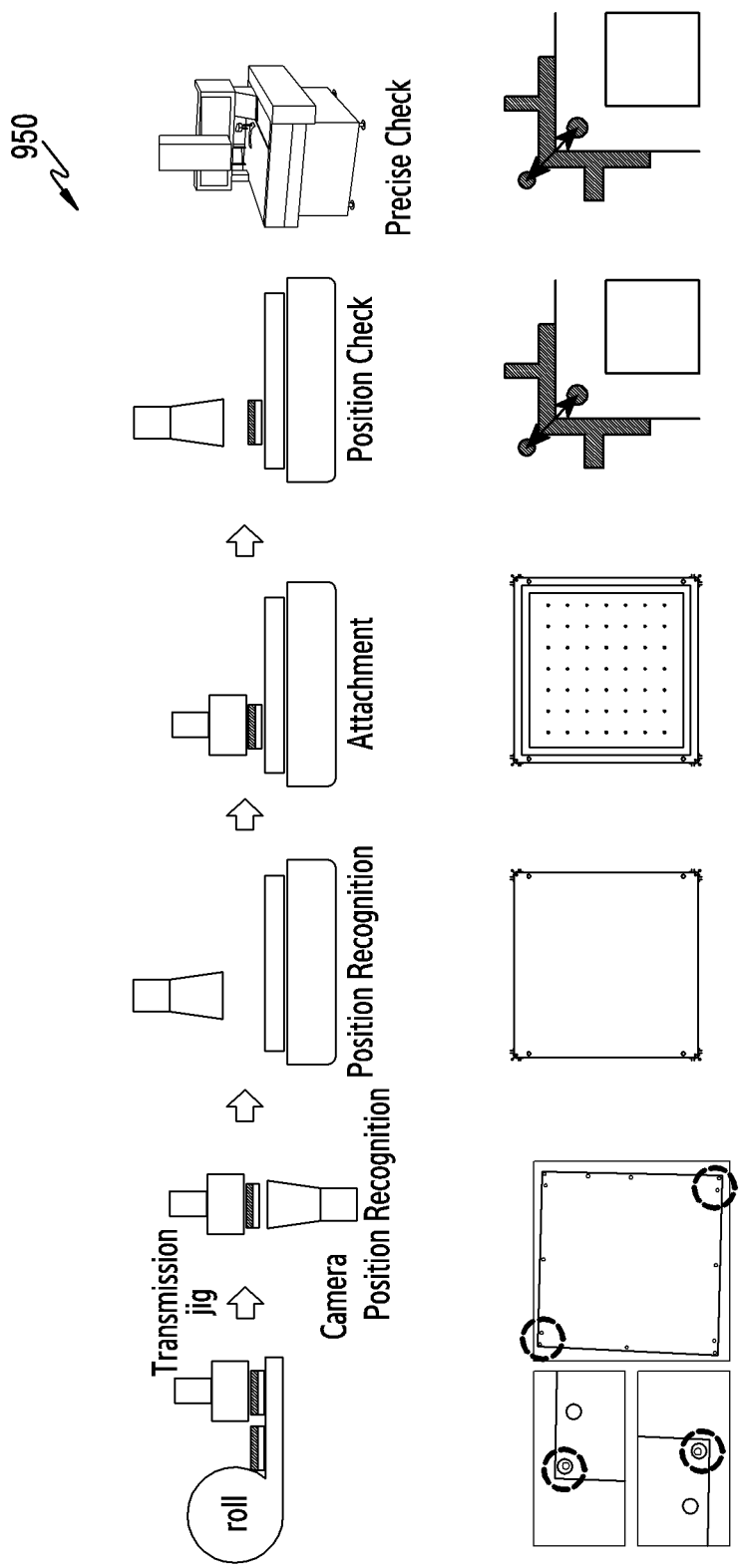

FIGS. 9A and 9B are views showing an example of an assembly process of an antenna board and an RF board according to various embodiments of the disclosure. An antenna board is a PCB on which an antenna is disposed, and may be referred to as a first PCB. An RF board is a PCB on which an RF feeding line and power supply components are arranged, and may be referred to as a second PCB. FIG. 9A shows an assembly process 900 of the first PCB and the second PCB, and FIG. 9B shows a detailed procedure of precise attachment 950 in the assembly process.

Referring to FIG. 9A, for the assembly process 900, the first PCB and the adhesive material may be laminated. According to an embodiment, the first PCB may include a structure for coupling connection. According to an embodiment, the adhesive material may include a bonding sheet or tape. After the first PCB and the adhesive material are coupled to each other, a first PCB bonding structure may be derived via a roll-to-roll process.

The second PCB may be coupled to the first PCB bonding structure. Surface treatment of the second PCB is performed. The first PCB bonding structure is disposed on one surface of the second PCB so as to be bonded to the second PCB. The first PCB and the second PCB may be connected to each other via structures configured to assist precise attachment between PCBs. The process of coupling via these structures is a process of attachment by structures, and may be referred to as pre-bonding so as to be distinguished from assembly (hereinafter, main bonding) precise attachment 950 in which a predetermined level or more pressure is applied. A specific pre-bonding procedure will be described in FIG. 9B.

After pre-bonding of the first PCB bonding structure and the second PCB, a main bonding process may be performed. In the main bonding process, for strong coupling connection of the first PCB and the second PCB, pressure is applied in a direction perpendicular to the surfaces of the PCB. Then, via inspection, an assembled PCB having a detachable antenna structure is output. According to an embodiment, a reflow process may be used to remove defective elements due to temperature instability and improve reliability of PCB quality, by configuring and checking the shape of a profile of each board. The heat capacity is different according to the type (e.g., material, size, and thickness) of a substrate. A reflow check may be performed to facilitate mass production of the structure between the coupled PCBs. Surface treatment may be performed on the output assembled PCB.

Referring to FIG. 9B, for precise attachment 950, that is, pre-bonding, structures (e.g., fiducial marks, vent holes, metal frames) of the first PCB or the second PCB may be used. A camera of an assembly equipment may identify the position of the first PCB bonding structure. According to an embodiment, at least one of a fiducial mark, a vent hole, or a metal frame may be used to position and align the bonding structure of the first PCB. The camera of the assembly equipment may identify the position of the second PCB. In order to position and align the second PCB, a fiducial mark may be used. If the position of the first PCB bonding structure and the position of the second PCB are confirmed, the two PCBs may be attached to align to the designated positions. After being attached, a position check may be performed by the camera. After passing the position check, a precise check may be performed. If the precise check is passed, the main bonding procedure of the assembly process 900 may be performed.

Figure 10:
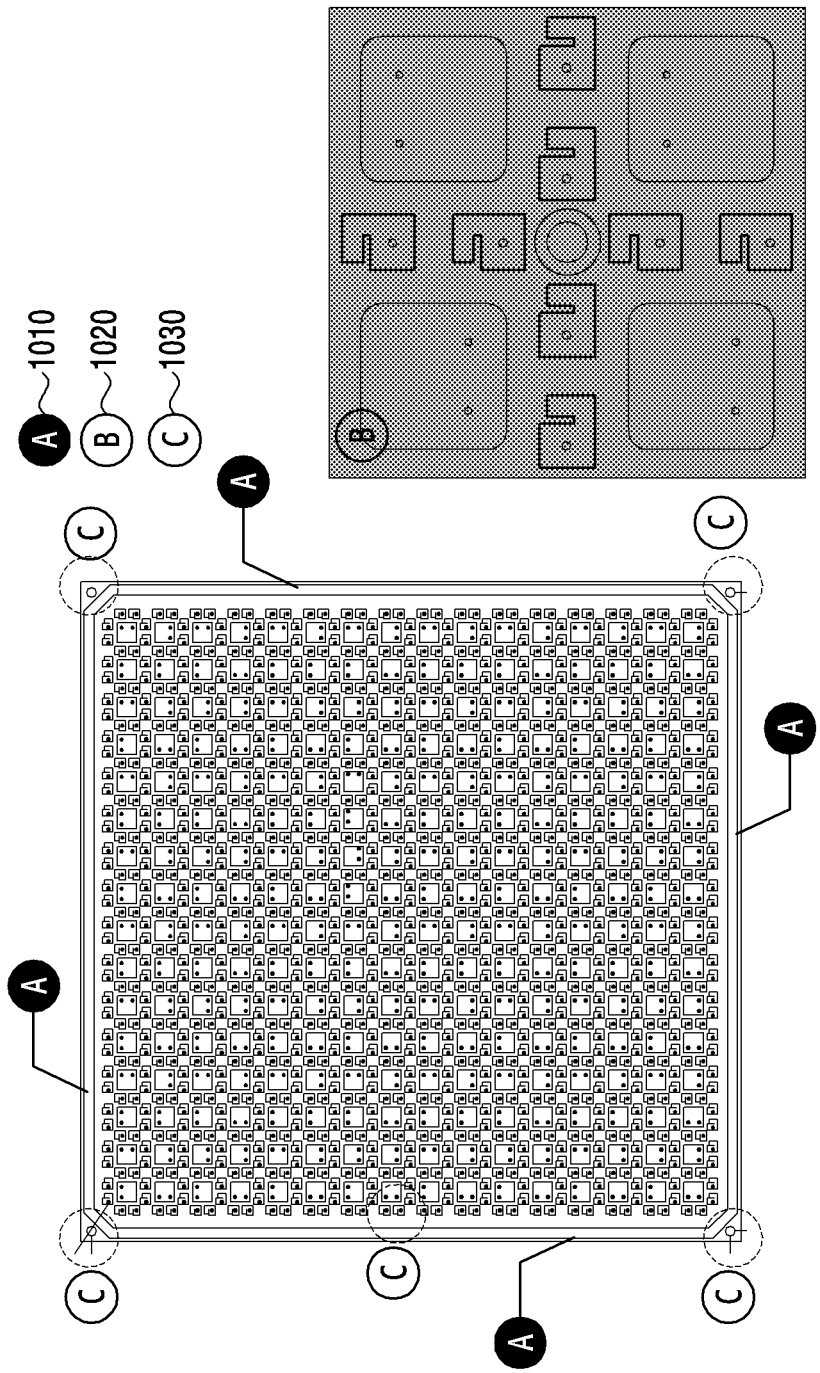
FIG. 10 shows an example of assembling an antenna board and an RF board according to an embodiment of the disclosure.

FIG. 10 shows an example of assembling an antenna board and an RF board according to an embodiment of the disclosure. An antenna board is a PCB on which an antenna is disposed, and may be referred to as a first PCB. An RF board is a PCB on which an RF feeding line and power supply components are arranged, and may be referred to as a second PCB. In the disclosure, a structure in which the first PCB and the second PCB are coupled to each other is shown, but this is only an example for convenience of explanation, and embodiments of the disclosure are not limited thereto. According to an embodiment, the second PCB may have a larger area than the first PCB. As shown in FIG. 2A, one or more first PCBs may be mounted on the second PCB. The second PCB is a main board, and may include areas for arrangement of a plurality of antenna modules. The first PCB on which multiple antenna elements are mounted may be disposed in one designated area on the second PCB.

Referring to FIG. 10, an antenna module having a detachable antenna structure may include structures for stable coupling between two PCBs. According to an embodiment, the first PCB may include a metal frame 1010. The metal frame 101 may be a structure for dimensional stability before and after the main bonding. The metal frame may be disposed around the first PCB. According to an embodiment, a vent hole 1020 may be disposed through the first PCB. The vent hole 1020 may be a structure configured to prevent air traps. The vent hole may be disposed on the first PCB. According to an embodiment, the first PCB may include a fiducial mark 1030. The fiducial mark may be used for internal circuit arrangement.

The second PCB is a main board, and may include areas for arrangement of a plurality of antenna modules. A first PCB on which multiple antenna elements are mounted may be disposed in one designated area on the second PCB. The first PCB may be disposed on a designated area of the second PCB. As an example, (16×16) antenna elements may be mounted on the first PCB. According to an embodiment, the second PCB may include fiducial marks. The fiducial marks may be structures configured to indicate a designated area. The fiducial marks may be structures for precise coupling of the first PCB and the second PCB. The fiducial marks may be arranged at the border on a designated area for an antenna module of the second PCB. The fiducial mark of the first PCB and the fiducial mark of the second PCB may be arranged at positions corresponding to each other. According to an embodiment, the first PCB may include a plurality of first fiducial marks. The second PCB may include a plurality of second fiducial marks. Positions of the plurality of first fiducial marks on the first PCB may correspond to positions of the plurality of second fiducial marks on the second PCB, respectively. Due to the corresponding positions, respective fiducial marks may be used to confirm arrangement of the coupling between two PCBs.

Referring to FIG. 10, in order to mark the border of a designated area, fiducial marks are shown at 5 places on the edges of the first PCB. However, this is only an example, and additional fiducial marks may be arranged for more elaborate alignment evaluation.

As shown in FIG. 10, an a-shaped metal structure may be additionally disposed between an antenna element and an antenna element. This metal structure may be positioned on the first PCB. The metal structure may be a structure configured to minimize the effect on adjacent antenna elements at the time of radiation of the antenna elements. In other words, the metal structure may be a structure configured to improve isolation performance.

Figure 11A:
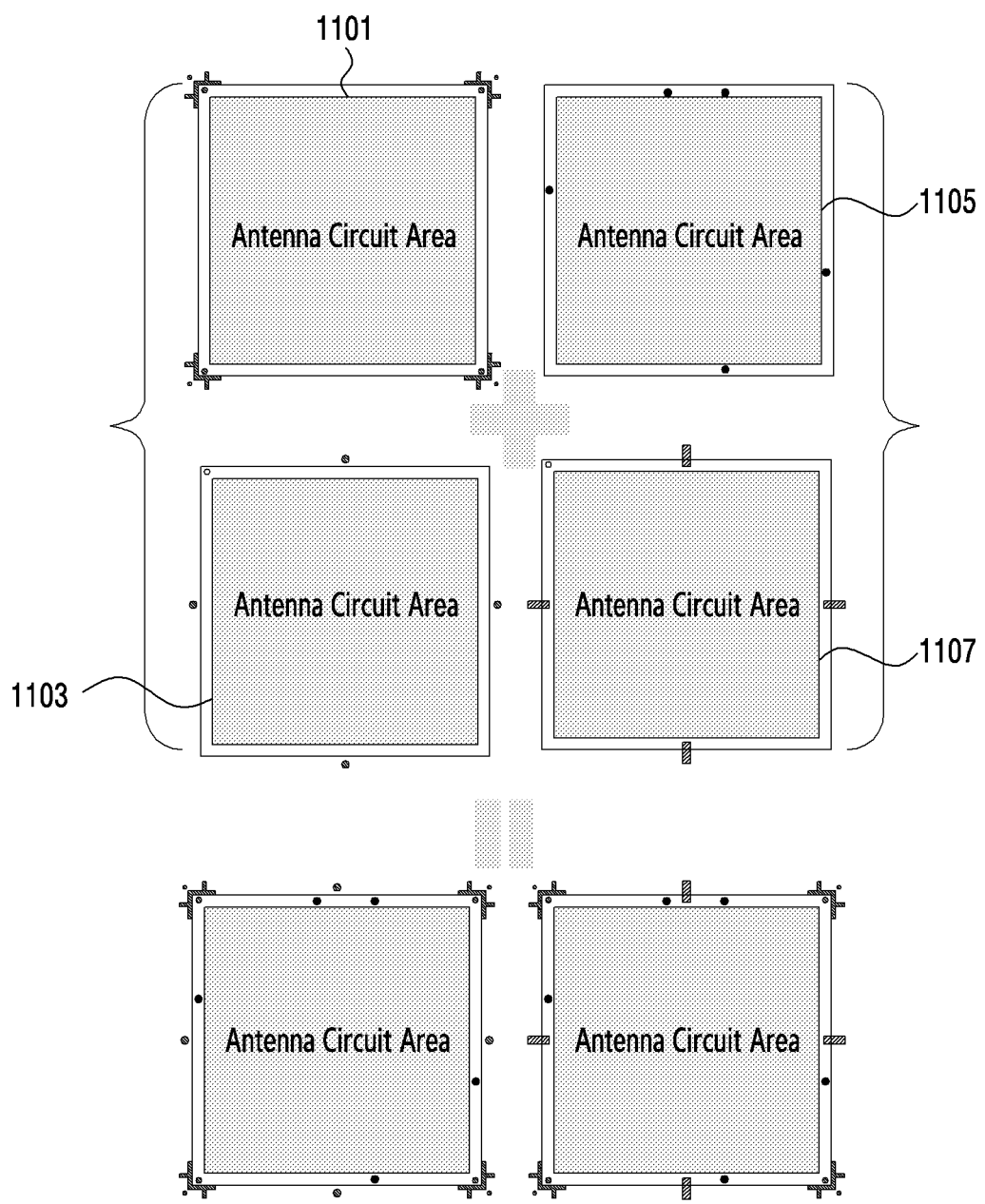
FIGS. 11A and 11B are views showing an example of alignment evaluation according to an assembly of an antenna board and an RF board according to various embodiments of the disclosure.
Figure 11B:
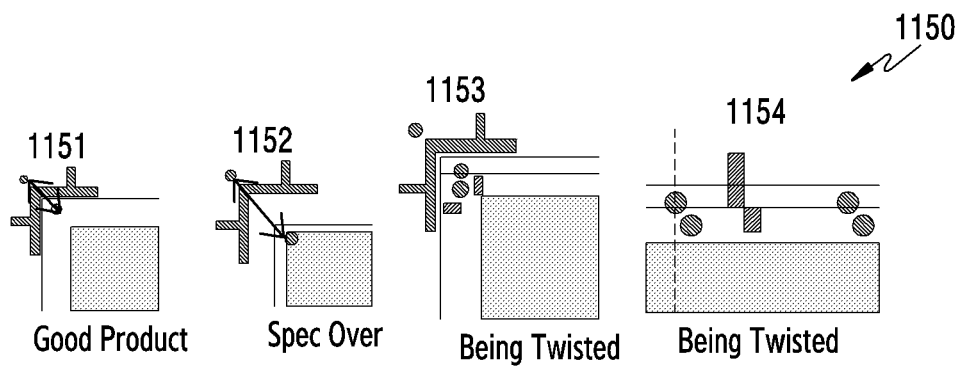
Figure 11B:
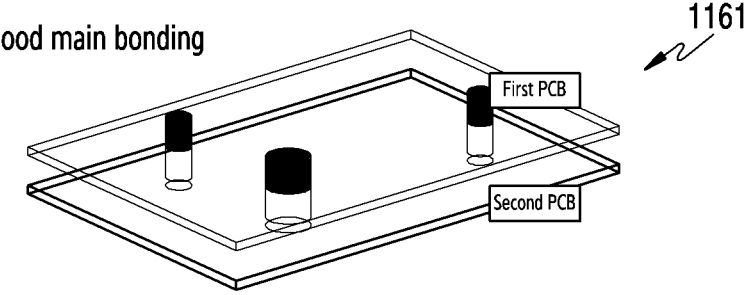
Figure 11B:
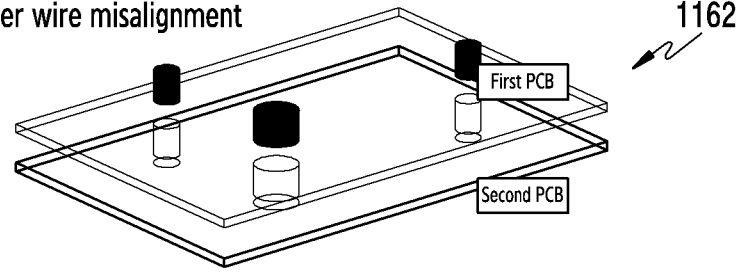

FIGS. 11A and 11B are views showing an example of alignment evaluation according to an assembly of an antenna board and an RF board according to various embodiments of the disclosure. After pre-bonding and main bonding, for alignment evaluation, fiducial marks may be implemented in various manners. FIG. 11A shows examples of fiducial marks of the first PCB and the second PCB, and FIG. 11B shows examples of the result of alignment evaluation.

Referring to FIG. 11A, according to an embodiment, a fiducial mark (hereinafter a second fiducial mark) may be disposed at each corner 1101 of an antenna circuit area of the second PCB. As an example, the second fiducial mark may have a shape of "ㄱ" which represents a corner. A fiducial mark (hereinafter, a first fiducial mark) corresponding to the second fiducial mark may be disposed on the first PCB in the antenna circuit area.

According to an embodiment, a second fiducial mark may be disposed on each side 1103 of an antenna circuit area of the second PCB. As an example, the second fiducial mark may have a circular shape. A first fiducial mark corresponding to the second fiducial mark may be disposed on the first PCB in the antenna circuit area.

According to an embodiment, a second fiducial mark may be disposed on the border 1105 of an antenna circuit area of the second PCB. As an example, the second fiducial mark may have a circular shape. A first fiducial mark corresponding to the second fiducial mark may be disposed on the first PCB in the antenna circuit area.

According to an embodiment, a second fiducial mark may be disposed on each side 1107 of an antenna circuit area of the second PCB. As an example, the second fiducial mark may have a quadrangular shape. A first fiducial mark corresponding to the second fiducial mark may be disposed on the first PCB in the antenna circuit area.

Referring to FIG. 11B, examples 1150 of alignment evaluation may include pass or fail. If the distance between the first fiducial mark of the first PCB and the second fiducial mark of the second PCB is less than a predetermined threshold 1151, the coupling structure may pass the alignment evaluation. As an example, a coupling structure 1161 may pass the alignment evaluation. However, in a case where the distance between the first fiducial mark on the first PCB and the second fiducial mark on the second PCB is greater than a predetermined threshold 1152, or the first fiducial mark and the second fiducial mark are distorted 1153 and 1154, the coupling structure may not pass the alignment evaluation. As an example, the coupling structure 1162 may not pass the alignment evaluation. The coupling structure 1162 may not pass the alignment evaluation due to misalignment between wires between layers.

Figure 12A:
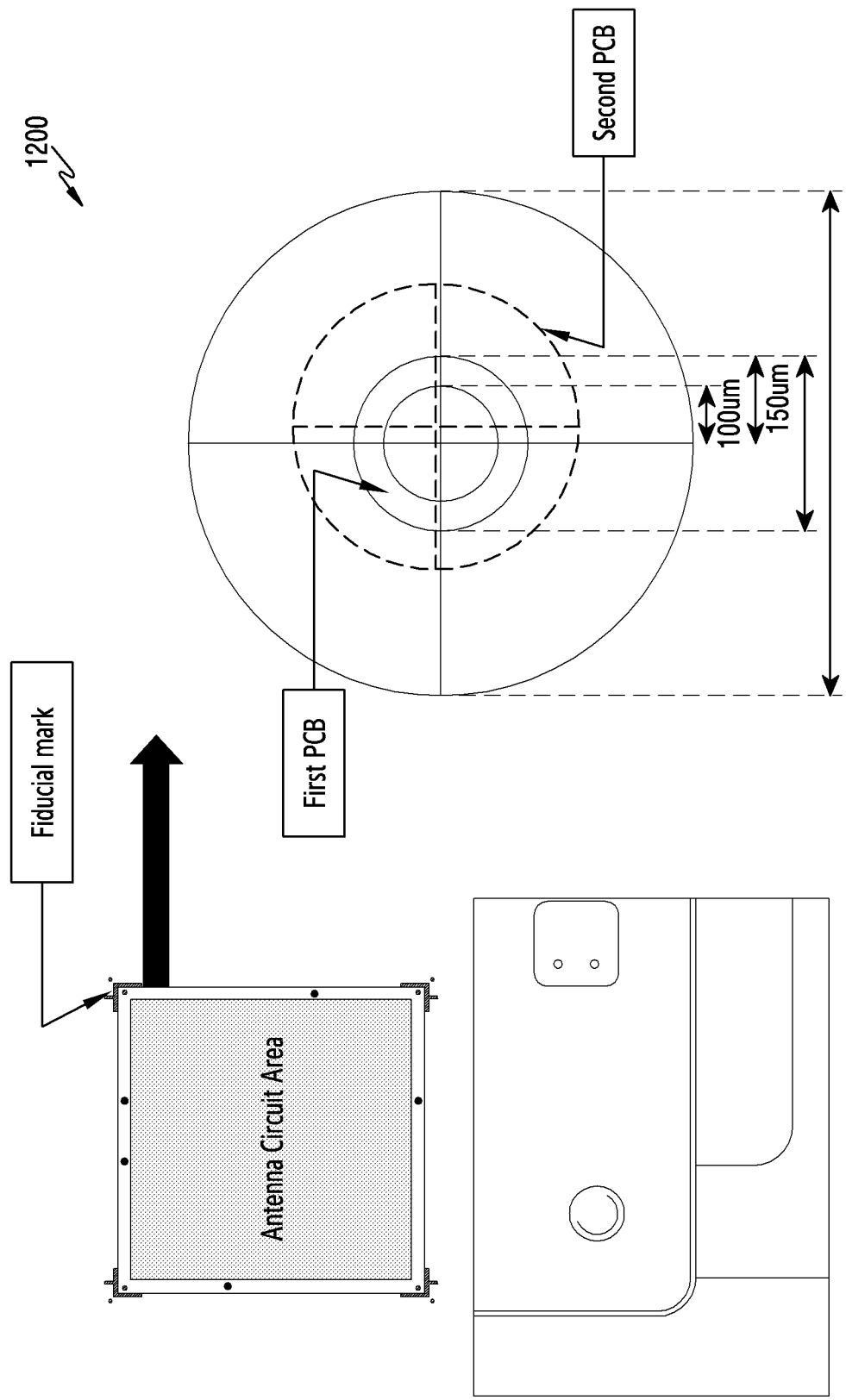
FIG. 12A is a view illustrating another example of alignment evaluation according to an assembly of an antenna board and an RF board according to various embodiments of the disclosure.
Figure 12B:
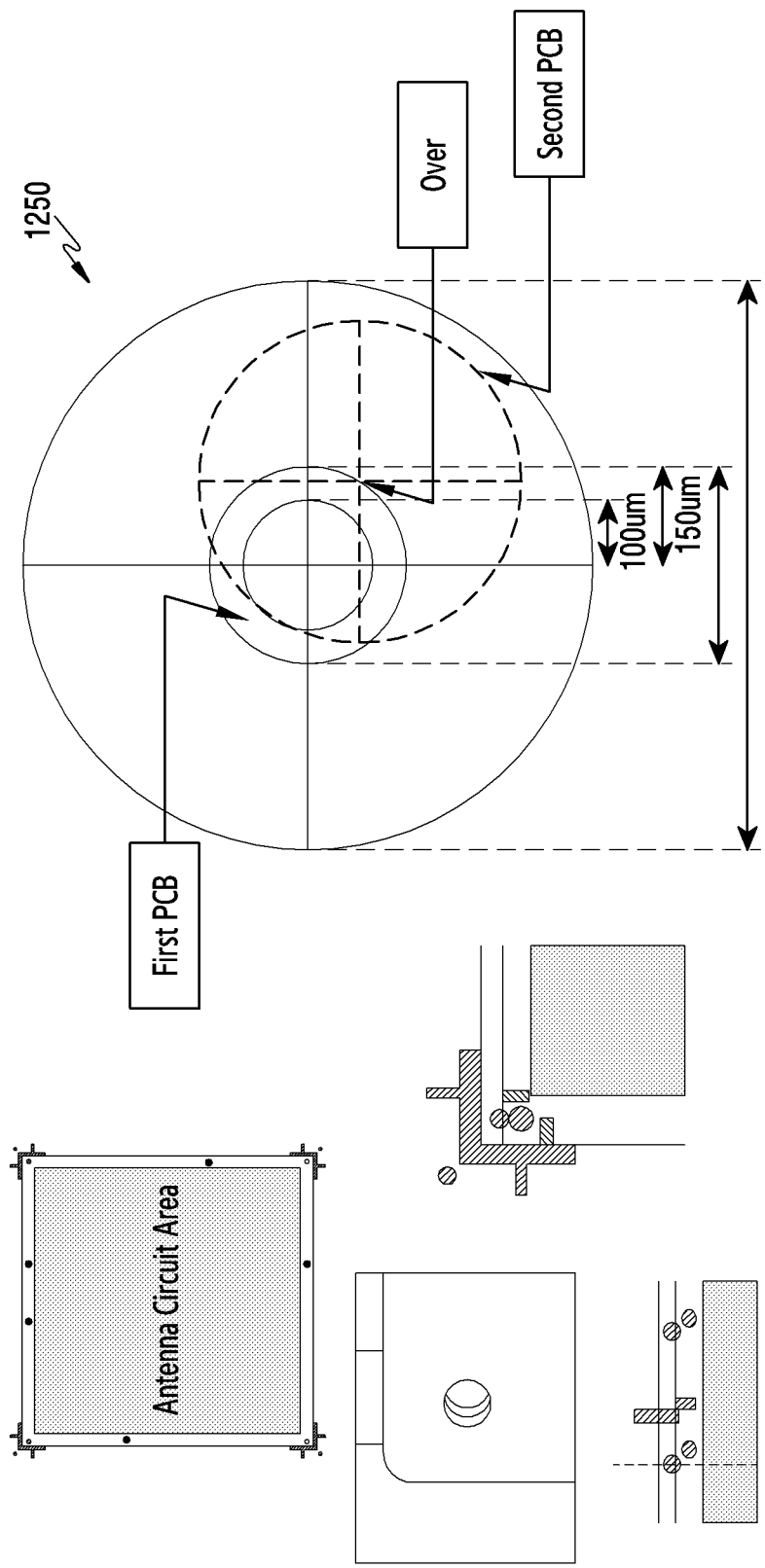
FIG. 12B is a view illustrating another example of alignment evaluation according to an assembly of an antenna board and an RF board according to various embodiments of the disclosure.

FIGS. 12A and 12B are views showing another example of alignment evaluation according to an assembly of an antenna board and an RF board according to various embodiments of the disclosure. An antenna board is a PCB on which an antenna is disposed, and may be referred to as a first PCB. An RF board is a PCB on which an RF feeding line and power supply components are arranged, and may be referred to as a second PCB.

Referring to FIG. 12A, an example 1200 of pass of alignment evaluation is shown. When the standard of assembly tolerance is assumed to be 100 µm, the center of the second PCB is within 100 µm with reference to the center of the first PCB, and thus the coupling structure of the first PCB and the second PCB is capable of passing the alignment evaluation. Referring to FIG. 12B, an example 1250 of fail of the alignment evaluation is shown. When the standard of assembly tolerance is assumed to be 100 µm, the center of the second PCB is larger than 100 µm with reference to the center of the first PCB, and thus the coupling structure of the first PCB and the second PCB is incapable of passing the alignment evaluation.

Figure 13:
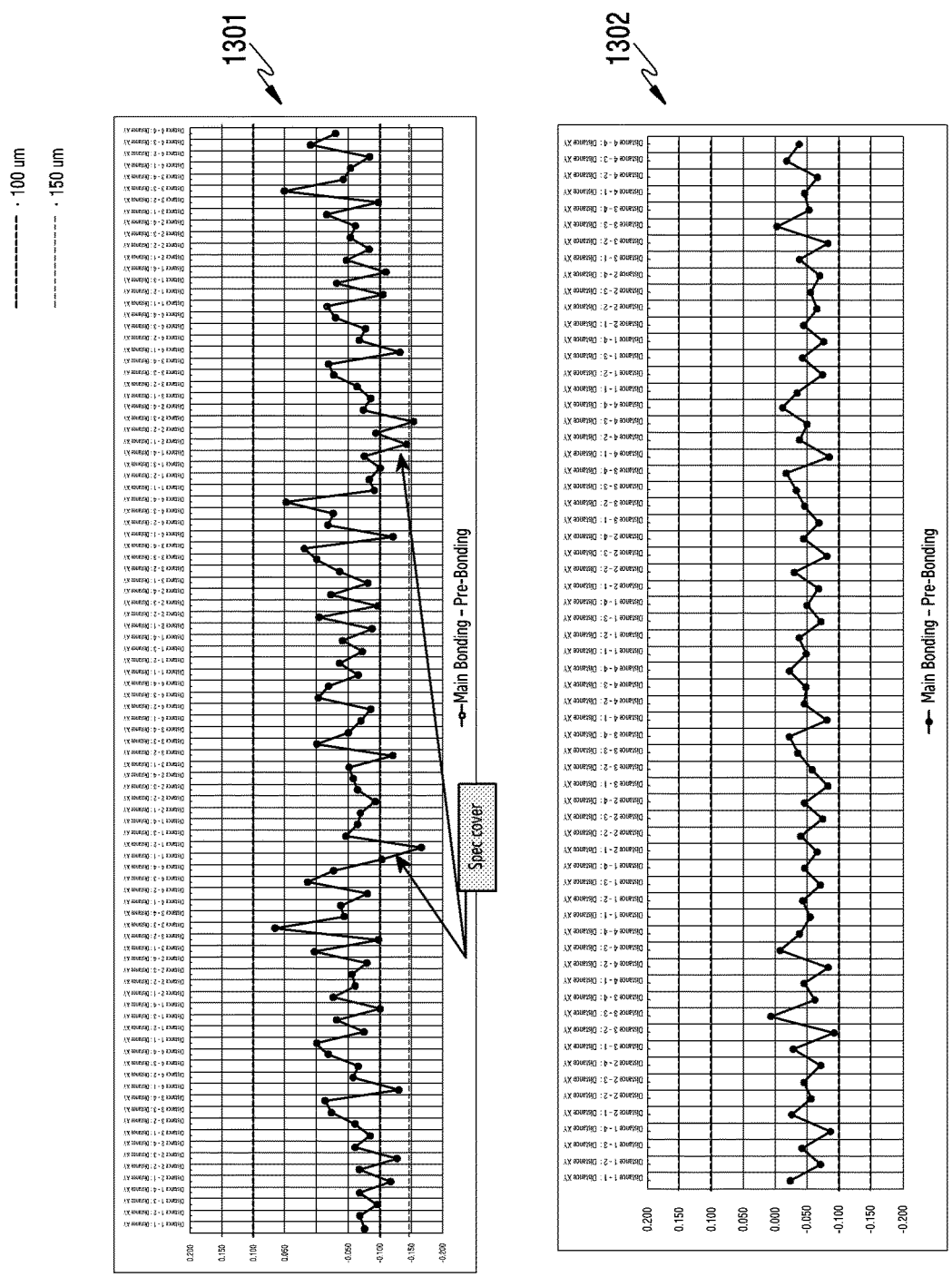
FIG. 13 shows an example of an offset application of an antenna board for alignment at the time of an assembling of an antenna board and an RF board according to an embodiment of the disclosure.
Figure 13:
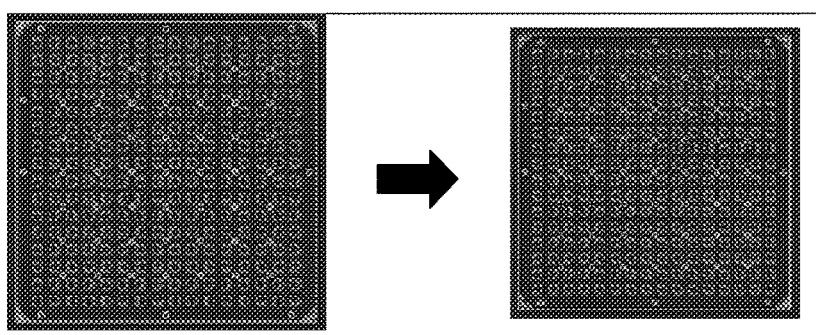

FIG. 13 shows an example of an offset application of an antenna board for alignment at the time of an assembling of an antenna board and an RF board according to an embodiment of the disclosure. An antenna board is a PCB on which an antenna is disposed, and may be referred to as a first PCB. An RF board is a PCB on which an RF feeding line and power supply components are arranged, and may be referred to as a second PCB. A coupling process of the first PCB and the second PCB of the disclosure may include a pre-bonding procedure in which the first PCB bonding structure (the result of combining the first PCB and the adhesive material) and the second PCB are simply coupled, and a main bonding procedure in which a press process is performed after the pre-bonding process. In the main bonding procedure, when hot-pressing a product obtained by coupling the first PCB and the second PCB, including a bonding sheet, the coupled product is difficult to be separated again. Therefore, if the alignment is misaligned by more than a threshold value at the time of coupling, both the first PCB and the second PCB are unusable. At the time of a coupling process, in order to minimize wasted resources, more precise alignment evaluation is required between the pre-bonding procedure and the main bonding procedure.

Referring to FIG. 13, a dimensional change of the first PCB may occur before and after the main bonding. An error may occur when coupling the first PCB and the second PCB. A graph 1301 shows a situation where the coupling of the first PCB and the second PCB is defective. The horizontal axis of the graph 1301 represents fiducial marks of the PCB. The vertical axis of the graph 1301 represents the difference in distance from each fiducial mark. Tolerance standard may be 100 µm or 150 µm. If an error exceeds the tolerance standard, the product is recognized as a defect. In order to reduce the defect rate in mass production, an offset may be applied to the dimensions of the first PCB. Before coupling the first PCB and the adhesive material to the second PCB, the manufacturing dimensions of the first PCB may be increased or decreased. A graph 1302 shows a situation where the coupling of the first PCB and the second PCB is normal. By applying an offset according to the dimensional change to the first PCB, the completion and attachment tolerances may be equal to or less than 100 µm.

Figure 14A:
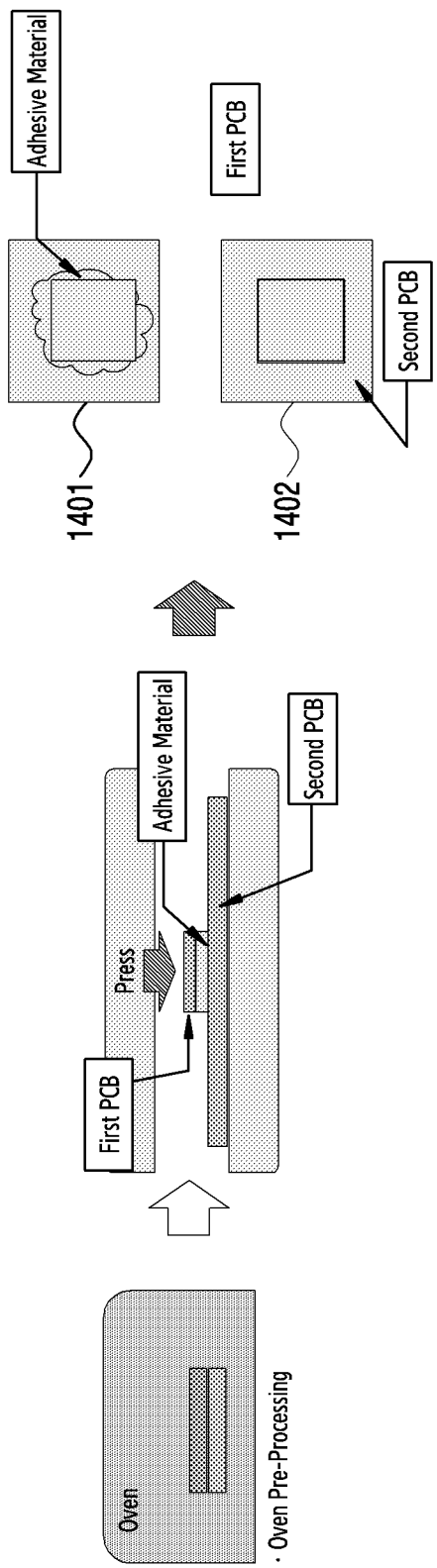
FIG. 14A is a view illustrating an example of resin flow control at the time of an assembling of an antenna board and an RF board according to various embodiments of the disclosure
Figure 14B:
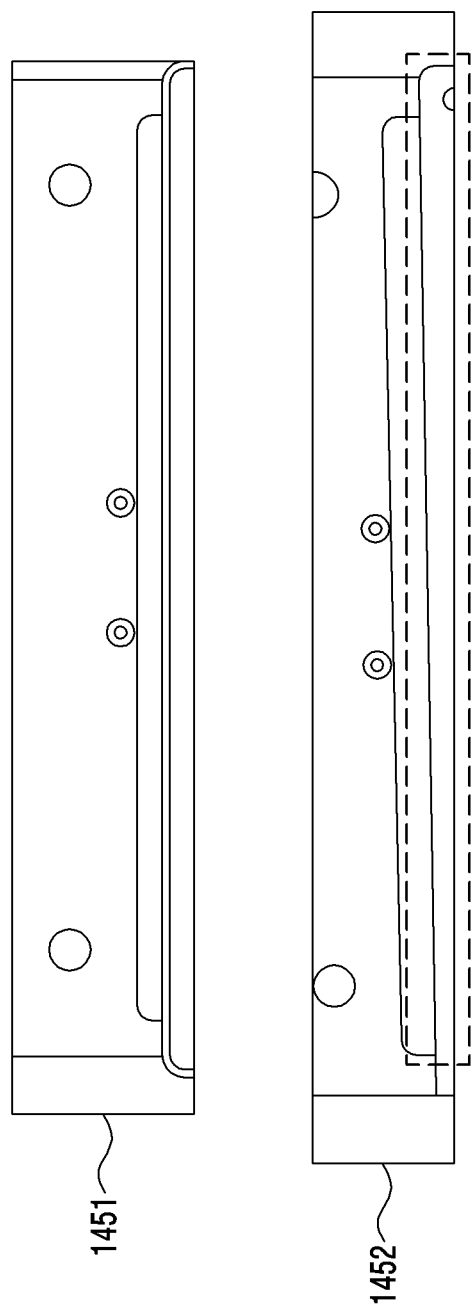
FIG. 14B is a view illustrating an example of resin flow control at the time of an assembling of an antenna board and an RF board according to various embodiments of the disclosure.

FIGS. 14A and 14B are views showing an example of resin flow control at the time of an assembling of an antenna board and an RF board according to various embodiments of the disclosure. An antenna board is a PCB on which an antenna is disposed, and may be referred to as a first PCB. An RF board is a PCB on which an RF feeding line and power supply components are arranged, and may be referred to as a second PCB. The assembling in FIGS. 14A and 14B may indicate the main bonding including a compression process. After the main bonding of the first PCB and the second PCB, the adhesive material may flow outside the area other than the first PCB, that is, outside the antenna circuit area. This phenomenon of an adhesive material flowing out of a designated area may be referred to as resin flow. According to an embodiment, at the time of the main bonding, the resin flow may be implemented to be 500 µm or less by changing heat, pressure, or time conditions.

Referring to FIG. 14A, for the main bonding of the first PCB and the second PCB, the first PCB and the second PCB may be coupled. For pretreatment before compression, the coupling structure of the first PCB and the second PCB may be positioned in an oven. After oven pretreatment, pressure (e.g., vertical pressure) may be applied to the coupling structure of the first PCB and the second PCB. Resin flow may occur according to pressure, heat, or press time. As an example, too much pressure may cause resin flow to occur. As an example, if the degree of heat is strong, resin flow may occur. As an example, if press time is long, resin flow may occur. If resin flow occurs by a predetermined distance or longer, the main bonding of the coupling structure may be determined to be a defect (1401). If resin flow occurs by less than a predetermined distance, the main bonding of the coupling structure may be identified to be a success (1402).

Referring to FIG. 14B, after the pre-bonding (here, the pre-bonding indicates a coupling before a compression process is performed) of the first PCB and the second PCB, oven pre-processing may not be performed. Thereafter, at the time of the main bonding of the first PCB and the second PCB, resin flow may occur by a predetermined distance or longer. The main bonding of the coupling structure may be identified to be a defect (1451). According to an embodiment, after the pre-bonding (here, the pre-bonding indicates a coupling before a compression process is performed) of the first PCB and the second PCB, oven pre-processing may be performed. At the time of the main bonding of the first PCB and the second PCB, resin flow may occur by less than a predetermined distance. The main bonding of the coupling structure may be identified to be a success (1452).

In the disclosure, in order to ensure antenna performance, a detachable antenna structure in which an antenna radiation layer and a dielectric layer are implemented as separate components has been described. An antenna module is coupled only to a partial area (e.g., four antenna module areas of FIGS. 2A and 2B) of a board configured to process an RF signal, and thus an antenna layer may be implemented only in a necessary area of the board. Structural efficiency of communication equipment is required to mount all of the antennas and signal processing components which are in increasing demand to achieve mmWave. Communication equipment using a detachable antenna structure according to embodiments of the disclosure may secure a required thickness. In addition, an antenna radiation layer and a dielectric layer are implemented as separate components, and thus a detachable antenna structure may provide high yield despite low complexity and cost.

The detachable antenna structure may include an adhesive material configured to couple an antenna board and an RF board. Coupling connection has been used as a method to transfer electrical signals between the antenna board and the RF board via the adhesive material. In order to increase mass production reliability and provide stable coupling connection, the antenna board and the RF board are required to be aligned at designated positions with high accuracy and also to have a robust structure to prevent misalignment from easily occurring. In order to minimize misalignment between the two boards and manufacture a robust antenna board, a press process may be used. In order to pass through the press process described above and provide high gains, a detachable antenna structure according to embodiments of the disclosure may be configured based on at least one of the thickness of copper foil, the number of PI films, the width of a hole, the thickness of an adhesive material, the thickness of an adhesive between a PI film and a PI film on the antenna board, and the thickness of an adhesive between a PI film and a metal layer.

Figure 15:
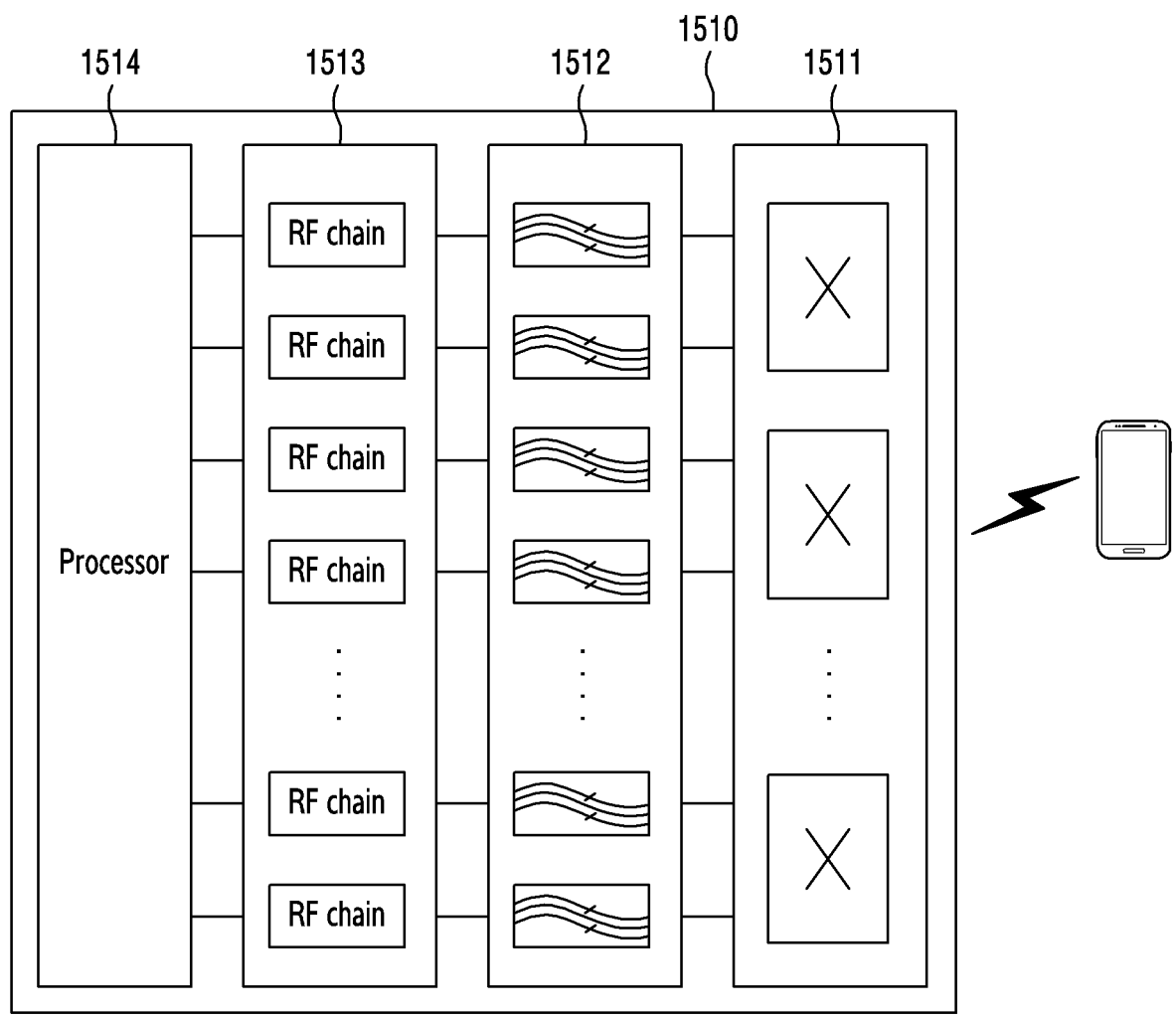
FIG. 15 shows a functional configuration of an electronic device having a detachable antenna structure according to an embodiment of the disclosure.

FIG. 15 shows a functional configuration of an electronic device having a detachable antenna structure according to an embodiment of the disclosure. The detachable antenna structure indicates a structure in which a board on which an antenna for radiation is disposed and a board on which RF components (e.g., an RF signal line, a power amplifier, and a filter) are arranged are separated. An electronic device 1510 may be one of the base station 110 or the terminal 120 in FIG. 1. According to an embodiment, the electronic device 1510 may be base station equipment configured to support mmWave communication. Not only the antenna structure itself mentioned with reference to FIGS. 1, 2A, 2B, 3, 4A to 4C, 5, 6, 7, 8, 9A, 9B, 10, 11A, 11B, 12A, 12B, 13, 14A, and 14B, but also an electronic device including the same is included in embodiments of the disclosure. The electronic device 1510 may include RF equipment having the detachable antenna structure.

Referring to FIG. 15, a functional configuration of the electronic device 1510 is shown. The electronic device 1510 may include an antenna unit 1511, a power interface unit 1512, a radio frequency (RF) processing unit 1513, and a controller 1514.

The antenna unit 1511 may include multiple antennas. The antenna performs functions for transmitting and receiving signals via a wireless channel. The antenna may include a radiator formed of a conductor or a conductive pattern disposed on a substrate (e.g., a PCB). The antenna may radiate an up-converted signal on a wireless channel or acquire a signal radiated by another device. Each antenna may be referred to as an antenna element or an antenna device. In some embodiments, the antenna unit 1511 may include an antenna array in which a plurality of antenna elements form an array. The antenna unit 1511 may be electrically connected to the power interface unit 1512 via the RF signal lines. The antenna unit 1511 may be mounted on a PCB including multiple antenna elements. According to an embodiment, the antenna unit 1511 may be mounted on a FPCB. The antenna unit 1511 may provide received signals to the power interface unit 1512 or radiate the signals provided from the power interface unit 1512 into the air.

The power interface unit 1512 may include a module and components. The power interface unit 1512 may include one or more IFs. The power interface unit 1512 may include one or more LOs. The power interface unit 1512 may include one or more LDOs. The power interface unit 1512 may include one or more DC/DC converters. The power interface unit 1512 may include one or more DFEs. The power interface unit 1512 may include one or more FPGAs. The power interface unit 1512 may include one or more connectors. The power interface unit 1512 may include one or more power supplies.

According to an embodiment, the power interface unit 1512 may include areas configured to mount one or more antenna modules therein. For example, like FIG. 2A, the power interface unit may include a plurality of antenna modules so as to support MIMO communication. An antenna module according to the antenna unit 1511 may be mounted in the corresponding area. According to an embodiment, the power interface unit 1512 may include a filter. The filter may perform filtering so as to transmit a signal at a desired frequency. The power interface unit 1512 may include a filter. The filter may perform a function of selectively identifying a frequency by forming a resonance. The power interface unit 1512 may include at least one among a band pass filter, a low pass filter, a high pass filter, or a band reject filter. In other words, the power interface unit 1512 may include RF circuits configured to obtain signals of a frequency band for transmission or a frequency band for reception. The power interface unit 1512 according to various embodiments may electrically connect the antenna unit 1511 and the RF processing unit 1513 to each other.

The RF processing unit 1513 may include a plurality of RF processing chains. The RF chain may include a plurality of RF devices. The RF devices may include an amplifier, a mixer, an oscillator, a DAC, an ADC, and the like. According to an embodiment, the RF processing chain may indicate an RFIC. For example, the RF processing unit 1513 may include an up converter configured to up-convert a digital transmission signal of a baseband to a transmission frequency and a digital-to-analog converter (DAC) configured to convert the up-converted digital transmission signal to an analog RF transmission signal. The up converter and the DAC configure a part of a transmission path. The transmission path may further include a power amplifier (PA) or a coupler (or a combiner). In addition, for example, the RF processing unit 1513 may include an analog-to-digital converter (ADC) configured to convert an analog RF reception signal to a digital reception signal and a down converter configured to convert a digital reception signal to a digital reception signal of a baseband. The ADC and the down converter configure a part of a reception path. The reception path may further include a low-noise amplifier (LNA) or a coupler (or a divider). RF components of the RF processing unit may be implemented on the PCB. A base station (e.g., electronic device 1510) may include a structure in which the antenna unit 1511, the power interface unit 1512, and the RF processing unit 1513 are stacked in the order. Antennas, RF components of the power interface unit, and RFICs may be implemented on a separate PCB, and filters are repeatedly fastened between a PCB and a PCB to form a plurality of layers.

The controller 1514 may control overall operations of the electronic device 1510. The controller 1514 may include various modules configured to perform communication. The controller 1514 may include at least one processor such as a modem. The controller 1514 may include modules for digital signal processing. For example, the controller 1514 may include a modem. At the time of data transmission, the controller 1514 encodes and modulates a transmission bit stream to produce complex symbols. In addition, for example, at the time of data reception, the controller 1514 restores a reception bit stream by demodulating and decoding the baseband signal. The controller 1514 may perform protocol stack functions required by communication standards.

Referring to FIG. 15, a functional configuration of the electronic device 1510 has been described as a device in which the antenna structure of the disclosure may be used. However, the example shown in FIG. 15 is only a configuration for using the RF filter structure according to various embodiments of the disclosure described via FIGS. 1 2A, 2B, 3, 4A to 4C, 5, 6, 7, 8, 9A, 9B, 10, 11A, 11B, 12A, 12B, 13, 14A, and 14B, and embodiments of the disclosure are not limited to the components of the device shown in FIG. 15. Therefore, an antenna module including an antenna structure, communication equipment of other configuration, and the antenna structure itself may also be understood as an embodiment of the disclosure.

According to embodiments of the disclosure, an electronic device may include: a plurality of antennas; a first printed circuit board (PCB) on which the plurality of antennas are arranged; a second PCB on which one or more elements configured to process radio frequency (RF) signals are arranged; and an adhesive material configured to couple the first PCB and the second PCB to each other, wherein the first PCB includes a first metal layer, a second metal layer, a dielectric, and a coupling structure plated along the first metal layer, the second metal layer, and a via hole between the first metal layer and the second metal layer, and is disposed to provide coupling connection via the coupling structure of the first PCB and a coupling pad of the second PCB.

According to an embodiment, the dielectric is a polyimide (PI) film configured as one layer, a first surface of the PI film is attached to the first metal layer via a first adhesive, and a second surface opposite to the first surface of the PI film may be attached to the second metal layer via a second adhesive.

According to an embodiment, the coupling structure may be configured by a plurality of plating layers according to the plating process.

According to an embodiment, pressure according to a distance between the first PCB and the second PCB may be applied to the adhesive material, and the distance between the coupling structure and the coupling pad may depend on the thickness of the adhesive material.

According to embodiments, the dielectric may include a first polyimide (PI) film and a second PI film, a first surface of the first PI film may be attached to the first metal layer via a first adhesive, a second surface opposite to the first surface of the first PI film and a first surface of the second PI film may be coupled to each other via a second adhesive, and a second surface opposite to the first surface of the second PI film may be attached to the second metal layer via a third adhesive.

According to an embodiment, the adhesive material may include a bonding sheet or adhesive tape.

According to embodiments, the first PCB may include an FPCB, and the coupling structure may include flexible copper clad laminate (FCCL).

According to embodiments, the first PCB may include a rigid PCB, and the dielectric may include pre-impregnated materials (Prepreg), copper clad laminate (CCL), or low temperature co-fired ceramic (LTCC).

According to embodiments, one or more metal structures configured to prevent interference between one antenna and another antenna among the plurality of antennas may be arranged on the first PCB.

According to embodiments, the first PCB may include one or more air vent holes and one or more first fiducial marks, the second PCB may include one or more second fiducial marks, and positions of the one or more second fiducial marks may correspond to positions of the one or more first fiducial marks.

According to embodiments, the antenna module may further include a metal frame configured to surround the first PCB.

According to embodiments of the disclosure, an electronic device may include: a plurality of first printed circuit boards (PCBs), wherein an antenna circuit is disposed on the plurality of first printed circuit boards; a second PCB on which a power supply, a direct current (DC)/DC converter, and a field programmable gate array (FPGA) are arranged; and a plurality of third PCBs, wherein a radio frequency integrated circuit (RFIC) is disposed on plurality of third PCBs, wherein each of the plurality of first PCBs is coupled to the second PCB via an adhesive material, each of the plurality of third PCBs is coupled to the second PCB via a grid array, a first PCB among the plurality of first PCBs includes a first metal layer, a second metal layer, a dielectric, and a coupling structure plated along the first metal layer, the second metal layer, and a via hole between the first metal layer and the second metal layer, and the coupling structure is disposed to provide coupling connection via a coupling pad of the second PCB.

According to an embodiment, the dielectric may be a polyimide (PI) film configured as one layer, a first surface of the PI film may be attached to the first metal layer via a first adhesive, and a second surface opposite to the first surface of the PI film may be attached to the second metal layer via a second adhesive.

According to embodiments, the coupling structure may be configured by a plurality of plating layers according to the plating process.

According to embodiments, pressure corresponding to the distance between the first PCB and the second PCB may be applied to the adhesive material, and the distance between the coupling structure and the coupling pad may depend on the thickness of the adhesive material.

According to embodiments, the dielectric may include a first polyimide (PI) film and a second PI film, a first surface of the first PI film may be attached to the first metal layer via a first adhesive, a second surface opposite to the first surface of the first PI film and a first surface of the second PI film may be coupled to each other via a second adhesive, and a second surface opposite to the first surface of the second PI film may be attached to the second metal layer via a third adhesive.

According to embodiments, the adhesive material may include a bonding sheet or adhesive tape.

According to embodiments, the first PCB may include an FPCB, and the coupling structure may include a flexible copper clad laminate (FCCL).

According to embodiments, the first PCB may include a rigid PCB, and the dielectric may include pre-impregnated materials (Prepreg), copper clad laminate (CCL), or low temperature co-fired ceramic (LTCC).

According to embodiments, one or more metal structures configured to prevent interference between one antenna and another antenna among the plurality of antennas may be arranged on the first PCB.

According to embodiments, the first PCB may include one or more air vent holes and one or more first fiducial marks, the second PCB may include one or more second fiducial marks, and positions of the one or more second fiducial marks may correspond to positions of the one or more first fiducial marks.

According to embodiments, the electronic device may further include a metal frame configured to surround the first PCB.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna module comprising:
a plurality of antennas;
a first printed circuit board (PCB) on which the plurality of antennas are disposed;
a second PCB on which one or more elements configured to process radio frequency (RF) signals are disposed; and
an adhesive material for coupling the first PCB and the second PCB,
wherein the first PCB comprises a first metal layer, a second metal layer, a dielectric, and a coupling structure plated along the first metal layer, the second metal layer, and a via hole between the first metal layer and the second metal layer, and
wherein the first PCB is disposed to provide coupling connection via the coupling structure of the first PCB and a coupling pad of the second PCB.

2. The antenna module of claim 1,
wherein the dielectric is a polyimide (PI) film configured as one layer,
wherein a first surface of the PI film is attached to the first metal layer via a first adhesive, and
wherein a second surface opposite to the first surface of the PI film is attached to the second metal layer via a second adhesive.

3. The antenna module of claim 1, wherein the coupling structure is configured by a plurality of plating layers according to the plating.

4. The antenna module of claim 1,
wherein pressure corresponding to a distance between the first PCB and the second PCB is applied to the adhesive material, and
wherein a distance between the coupling structure and the coupling pad depends on thickness of the adhesive material.

5. The antenna module of claim 1,
wherein the dielectric comprises a first polyimide (PI) film and a second PI film,
wherein a first surface of the first PI film is attached to the first metal layer via a first adhesive,
wherein a second surface of the first PI film opposite to the first surface of the first PI film is coupled to a first surface of the second PI film via a second adhesive, and
wherein a second surface of the second PI film opposite to the first surface of the second PI film is attached to the second metal layer via a third adhesive.

6. The antenna module of claim 1, wherein the adhesive material comprises a bonding sheet or adhesive tape.

7. The antenna module of claim 1,
wherein the first PCB comprises a flexible printed circuit board (FPCB), and
wherein the coupling structure comprises flexible copper clad laminate (FCCL).

8. The antenna module of claim 1,
wherein the first PCB comprises a rigid PCB, and
wherein the dielectric comprises pre-impregnated materials (Prepreg), copper clad laminate (CCL), or low temperature co-fired ceramic (LTCC).

9. The antenna module of claim 1, wherein one or more metal structures configured to prevent interference between one antenna and another antenna among the plurality of antennas are disposed on the first PCB.

10. The antenna module of claim 1,
wherein the first PCB comprises one or more air vent holes and one or more first fiducial marks,
wherein the second PCB comprises one or more second fiducial marks, and
wherein positions of the one or more second fiducial marks correspond to positions of the one or more first fiducial marks.

11. The antenna module of claim 10, further comprising:
a metal frame configured to surround the first PCB.

12. An electronic device comprising:
a plurality of first printed circuit boards (PCBs), an antenna circuit being disposed on each of the plurality of first PCBs;
a second PCB on which a power supply, a direct current (DC)/DC converter, and a field programmable gate array (FPGA) are disposed; and
a plurality of third PCBs, a radio frequency integrated circuit (RFIC) being disposed on each of the plurality of third PCBs,
wherein each of the plurality of first PCBs is coupled to the second PCB via an adhesive material,
wherein each of the plurality of third PCBs is coupled to the second PCB via a grid array,
wherein a first PCB among the plurality of first PCBs comprises a first metal layer, a second metal layer, a dielectric, and a coupling structure plated along the first metal layer, the second metal layer, and a via hole between the first metal layer and the second metal layer, and
wherein the coupling structure is disposed to provide coupling connection via a coupling pad of the second PCB.

13. The electronic device of claim 12,
wherein the dielectric comprises a first polyimide (PI) film and a second PI film,
wherein the first PI and the second PI comprise a PI film configured as one layer,
wherein a first surface of the PI film is attached to the first metal layer via a first adhesive, and
wherein a second surface opposite to the first surface of the PI film is attached to the second metal layer via a second adhesive.

14. The electronic device of claim 12, wherein the coupling structure is configured by a plurality of plating layers according to the plating.

15. The electronic device of claim 12,
wherein pressure corresponding to a distance between the first PCB and the second PCB is applied to the adhesive material, and
wherein a distance between the coupling structure and the coupling pad depends on a thickness of the adhesive material.

16. The electronic device of claim 12,
wherein a thickness of the adhesive material depends on a size of the via hole.

17. The electronic device of claim 12, wherein the via hole is configured to feed an antenna.

18. The electronic device of claim 12, wherein a thickness of the adhesive material is selected from 25 to 100 µm.

19. The electronic device of claim 18, wherein the thickness depends on a type of an antenna.

20. The electronic device of claim 12, wherein the adhesive material comprises a bonding sheet or adhesive tape.

* * * * *